United States Patent [19]

Lelke

[11] 4,069,511
[45] Jan. 17, 1978

[54] DIGITAL BIT IMAGE MEMORY SYSTEM

[75] Inventor: Helmut Lelke, Southboro, Mass.

[73] Assignee: Raytheon Company, Lexington, Mass.

[21] Appl. No.: 691,686

[22] Filed: June 1, 1976

[51] Int. Cl.² .............................................. G06F 3/14
[52] U.S. Cl. .............................. 364/200; 340/324 AD
[58] Field of Search ................ 340/172.5, 324 AD; 364/200

[56] References Cited

U.S. PATENT DOCUMENTS

| 3,653,001 | 3/1972 | Hinke | 340/172.5 |
| 3,760,375 | 9/1973 | Irwin et al. | 340/172.5 |
| 3,778,810 | 12/1973 | Hayashi | 340/324 AD |
| 3,805,252 | 4/1974 | Morris et al. | 340/172.5 |
| 3,812,488 | 5/1974 | Yoshino et al. | 340/324 AD |
| 3,848,232 | 11/1974 | Leibler et al. | 340/172.5 |
| 3,849,773 | 11/1974 | Katahira et al. | 340/324 AD |
| 3,961,324 | 6/1976 | Cousin et al. | 340/324 AD |

Primary Examiner—Gareth D. Shaw
Assistant Examiner—C. T. Bartz
Attorney, Agent, or Firm—John R. Inge; Joseph D. Pannone; Milton D. Bartlett

[57] ABSTRACT

A digital bit image memory system especially adapted for use in a newspaper-type composition and display system. At least one digital storage location is provided for each elemental display position. The memory system is formed with plural rows and columns of random access memory devices which are arranged and continually addressed to simultaneously refresh the display and maintain the stored data.

19 Claims, 31 Drawing Figures

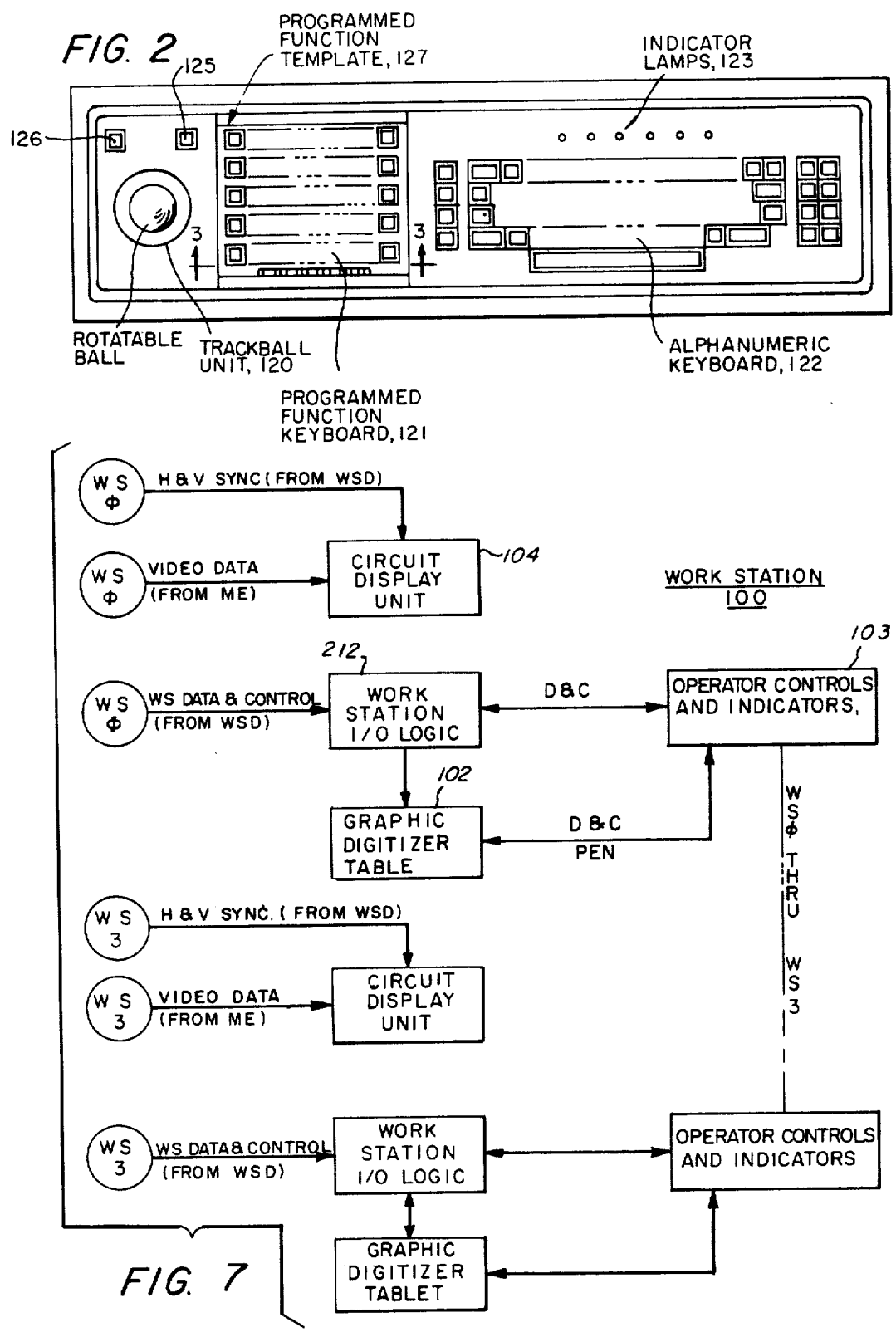

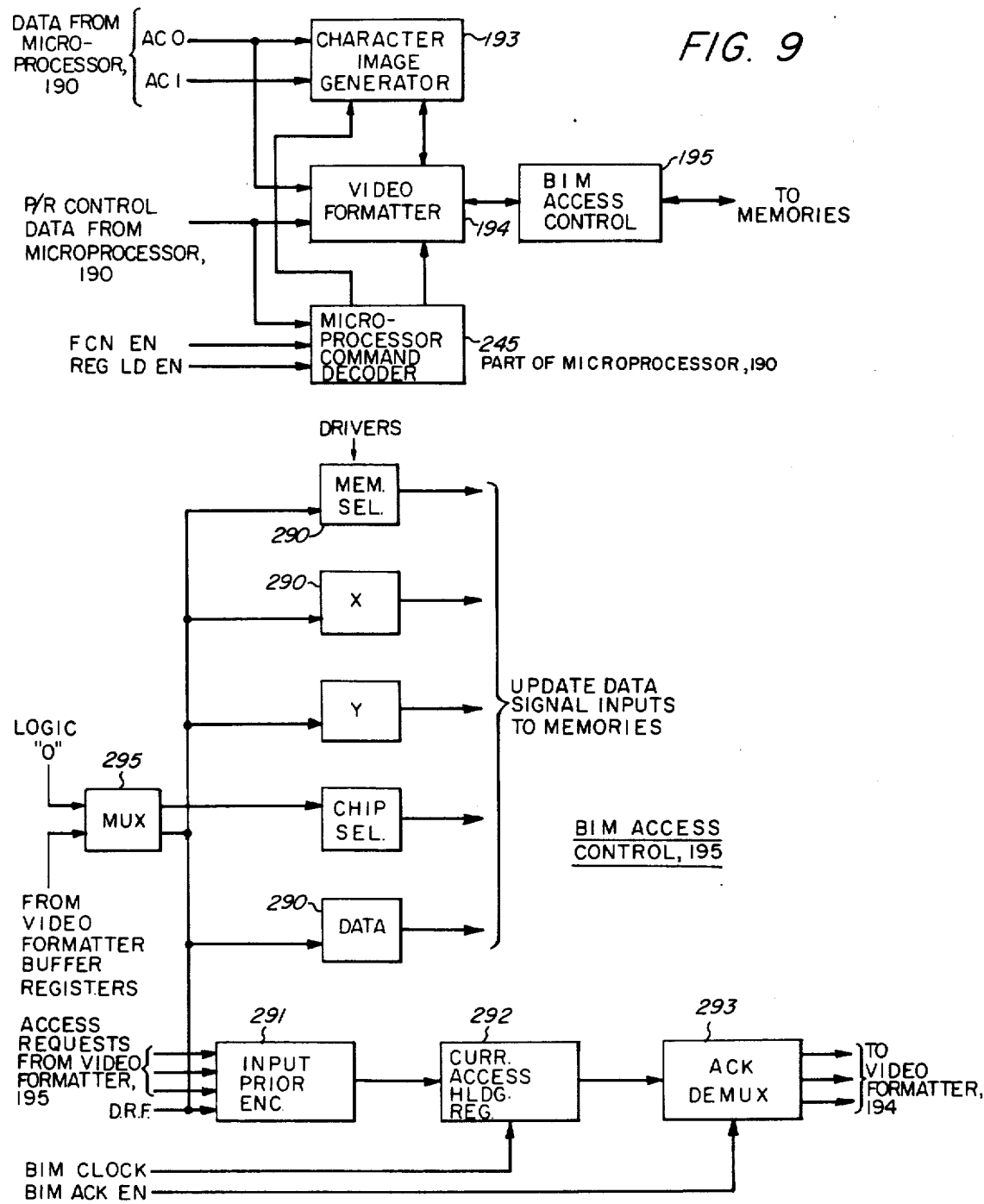

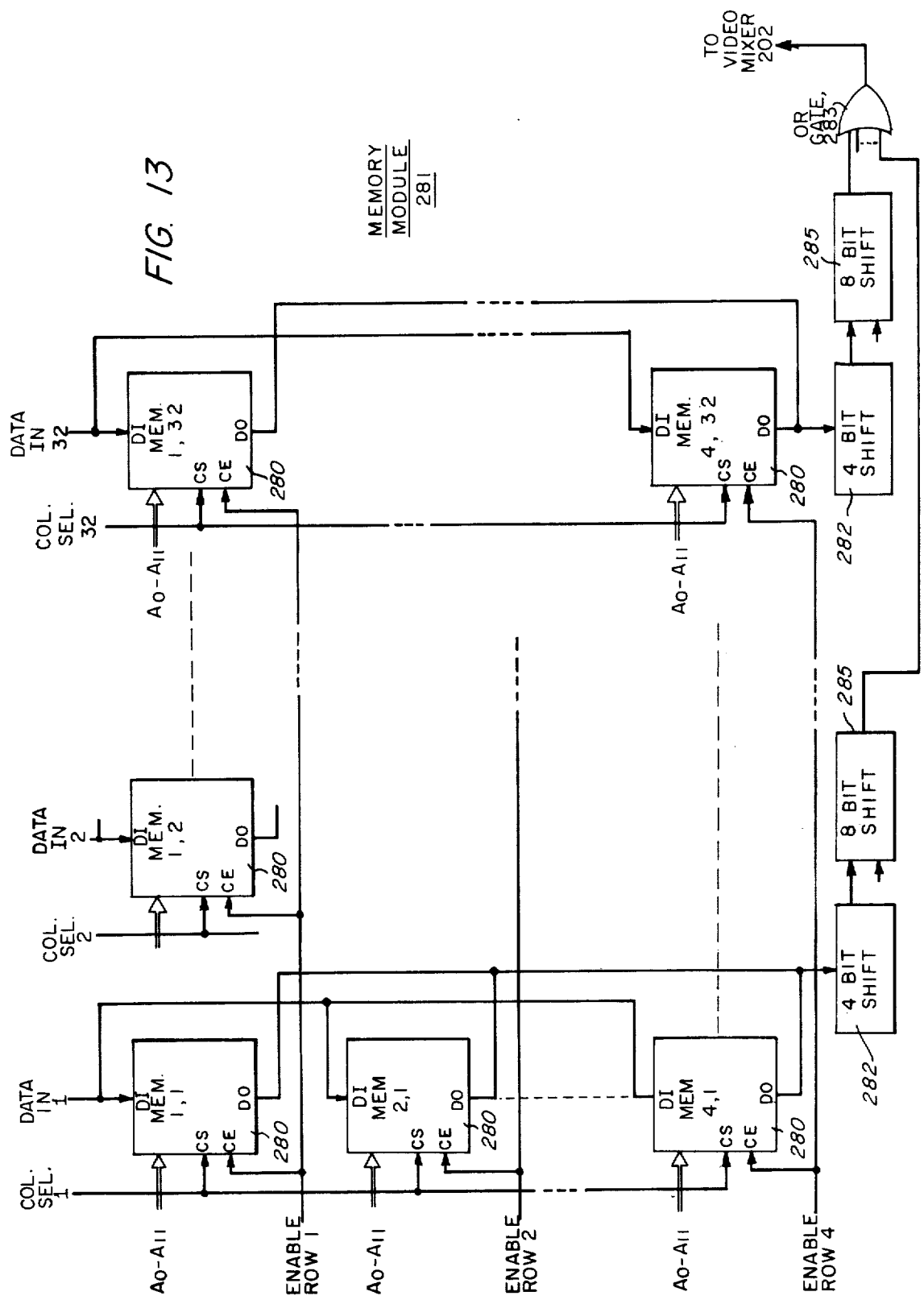

DIGITAL BIT IMAGE MEMORY SYSTEM

BACKGROUND OF THE INVENTION

1. Field of the Invention

The invention pertains to the composition of advertising matter as would be done for a newspaper, classified telephone or business directory and to other related uses. More particularly, the invention relates to an electronic composition and display system for permitting an operator to quickly and accurately compose advertising display matter without the need for most hand layout and composition functions.

2. Description of the Prior Art

Throughout the modern history of newspapers, the composition and layout of advertising matter has been a time consuming and labor-intensive task. To compose a typical advertisement, an ad-layout operator would first make a rough pencil sketch of the proposed advertisement in accordance with the intructions of the advertising computer. The operator would sketch rough areas in which pictures or sketches were to be displayed and block out areas in which textual matter was to be fitted. Large type headings were sketched in with the composer making only a rough estimate as to the actual size and length of the particular heading. Once the rough sketch was made, composing room personnel would "paste up" the actual pictures upon a mark-up of the advertisement and attempt to fit the textual matter within the boundaries set by the composing operator. Often, the text would not fit within the boundaries estimated. For example, the large textual headings would extend over the boundaries of the advertisement making the entire layout unacceptable. At this point, the mark-up of the advertisement was sent back to the composing room for a second try. Often the process had to be repeated three or more times before an acceptable copy was obtained.

Later, electronic composition systems were described for permitting an operator to partially compose an advertisement upon an electronic interactive terminal. With some of these systems, the operator could type in textual matter or enter such textual matter upon a position determined by him upon the CRT (cathode ray tub) screen. In these systems, data was displayed upon a CRT screen corresponding to the text and its positions within the actual advertising copy. These systems provided an output in the form of a punched paper tape or other digitized form of output which was transferred to a phototypesetter or other similar device. The phototypesetter then produced a copy of the textual matter with which the photographs or sketches and other nontextual matter were then pasted up.

Although such systems have somewhat reduced the intensity of labor involved in a typical advertisement composition situation, the systems heretobefore known were not able to perform many of the most critical advertising composition functions. For example, the character produced upon the screens of previously known systems were not true representations of the character sizes used in the actual advertising copy. For that reason, the operator could not be certain that the positions and spacing chosen would alternately be acceptable in the final advertising copy. Moreover, in none of the previously known systems was an operator able to flow text as is so often required in advertising composition. Furthermore, the number of lines and the position of lines displayed upon the CRT's in previously known systems were extremely limited because, inter alia, of the memory systems typically employed. Still further, other problems were encountered in the reaction speed of the system to operator-initiated commands. For example, if an operator wished to erase an image of one advertisement and replace it with an entirely new image of another advertisement, long time delays were involved. If more than one work station were connected to a common computer or digital processing system servicing each work station, operation upon one of the work stations typically completely tied up the digital processing system making it unavailable for servicing all the other work stations until the first work station had finished its particular operation.

SUMMARY OF THE INVENTION

Accordingly, it is an object of the present invention to provide an operator-interactive digital data and display system having a bit image memory system for improved data display capability.

Furthermore, it is an object of the present invention to provide such a digital data and display system in which the entire advertising copy may be closely simulated.

Also, it is an object of the invention to provide such a digital data and display system having the capability of displaying as many lines, symbols, or other data as required to compose an entire advertising copy.

Moreover, it is further an object of the invention to provide such a digital data and display system which responds quickly to operator-furnished inputs and in which interference between work stations operating from a common digital processor is substantially minimized.

These, as well as other objects of the invention, may be met by providing a bit image memory for use with a visual display system which comprises the combination of a semiconductor memory having at least one digital storage location therein for each elemental display position or area upon the visual display means and means for reading data out from the memory to produce an image upon the visual display means with the memory being refreshed to insure data retention therein within the refresh time period of the visual display means. The semiconductor memory in the preferred embodiment is constructed with a plurality of semiconductor random access memory devices. Each of the random access memories has a plurality of address input lines predetermined ones of which are activated within a predetermined maximum refresh time to insure data retention within each of the random access memories. Means is provided for reading data out from the semiconductor memory to produce a video signal for operating each of the visual display means. The reading out means preferably includes a plurality of shift registers the outputs of which are combined to form the video signal.

The invention may also be practiced by a bit image memory system for refreshing one or more raster scanned visual display devices which comprises the combination of a plurality of random access memory devices arranged in a plurality of rows and columns, a first plurality of shift registers each of which receives data read out from one of the columns of memory devices, a second plurality of shift registers which receive data from at least one of the first plurality of shift registers, and means for shifting data out of the shift registers of the second plurality of shift registers one at a time to produce an output video signal. The random access memory devices each preferably comprise an MOS random access memory chip. Each of the random access memory devices has a plurality of address input lines predetermined ones of which required activation within a predetermined maximum time period in order to retain data stored within the memory device. Means is provided for producing digital signals for addressing each of the random access memory devices in which the digital signals represent positions upon the display surface of one of the visual display devices. The addressing digital signals and the address input lines are both ordered in a binary sequence with the digital signals coupled to the address lines in other than a corresponding sequence. That is, some of the lines are connected out of sequence other than in corresponding ascending order.

The invention may further be practiced by a digital data display system which comprises the combination of means for producing character patterns, means for producing line patterns, a plurality of display means, a plurality of memory modules for storing the character and line pattern data with two of the semiconductor modules being provided for storing the character and line pattern data for each of the display means, and means for reading data out of the memory modules to produce a video signal for operating the display means. The display means each preferably comprises a raster scanned cathode-ray tube display means. Each of the raster scanned lines upon each of the display means is divided into a plurality of segments, data for producing the video signal for adjacent ones of the line segments being coupled from alternate ones of the memory modules. Each of the memory modules preferably comprises a plurality of rows and columns of random access memory devices each of which has a plurality of address input lines, at least one data input line, and at least one data output line with corresponding ones of the address input lines from each of the memory devices being coupled together and with the data output lines from all memory devices within each column being coupled to one of a plurality of shift registers. One of the columns of memory devices is provided for each elemental display area or position within each of the segments along a raster scanned line. Means is provided for addressing the memory devices which in the preferred embodiment comprise 1 × N-bit MOS random access memories. The addressing means activates predetermined ones of the address input lines within a predetermined maximum time period during normal refresh of the display means in order to maintain the data stored within the memory devices.

BRIEF DESCRIPTION OF THE DRAWINGS

FIG. 2 is a planar view of the operator controls and indicators of one of the work stations of the system shown in FIG. 1;

FIGS. 6 and 7 taken together are a detailed block diagram of the system shown in FIG. 5;

FIG. 9 is a detailed block diagram of the chatacter generator of the system shown in FIG. 6;

FIG. 13 is a diagram of a memory module of the bit image memory of the system shown in FIG. 6;

FIG. 16 is a diagram of the bit image memory access control circuitry of the system shown in FIG. 6;

DESCRIPTION OF THE PREFERRED EMBODIMENTS

Figure 1:
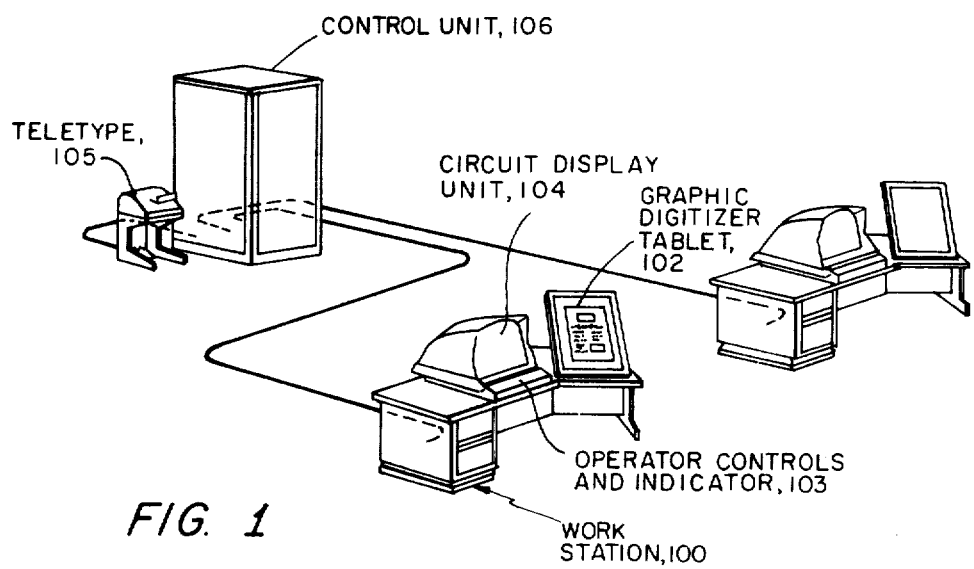
FIG. 1 is a sketch of a digital data and display system adapted for advertising copy layout embodying the present invention.

Referring first to FIG. 1 there is shown therein a sketch of a portion of a digital data and display system in accordance with the present invention which is particularly adapted for use with composing advertising copy. The basic components of the system include a control unit 106 and one or more work stations 100 connected thereto. Each work station 100 includes a CRT display unit 104, operator controls and indicators 103 and a graphic digitizer tablet 102. Teletype 105 may be provided for entry of externally sampled digital data.

Work stations 100 are the basic input/output devices of the system which permit an operator to completely compose an advertising copy with assurance that all text, symbols, and sketches or photographs fit within predicted space limitations and that the advertisements composed thereupon are in all ways acceptable as final copy for printing. Control unit 106 contains the basic data processing circuitry and memory for operating each of work stations 100 and suitable output circuitry for producing a digital output to a phototypesetter or remote computer representative of the composed advertisement.

An operator may enter data into the system in the form of lines or symbols and characters using either operator controls and indicators 103 or graphic digitizer tablet 102. Typically in an advertising composition sequence, a rough hand-drawn copy or mark-up of the advertisement upon a piece of paper is attached to the surface of graphic digitizer tablet 102. A number of commercially available graphic digitizer tablets may be used for graphic digitizer tablet 102 for example, a Summagraphics Company Data Table/Digitizer tablet device. With this tablet, an operator may move a specially provided pen over outlines of photographs or along other lines or boundaries that he wishes displayed in the advertisement. As he moves the specially provided pen over the surface of the advertisement in graphic digitizer tablet 102, digital outputs are relayed back to control unit 106 continuously indicative of the position of the pen point upon the surface of graphic digitizer tablet 102. These digital positions cause the display upon CRT display unit 104 of corresponding lines or boundaries.

The operator may also enter data via operator controls and indicators 103 which are shown in more detail in FIG. 2. These are three basic sections of operator controls and indicators 103 including trackball unit 120, programmed function keyboard 121, and alphanumeric keyboard 122. Alphanumeric keyboard 122 is a standard typewriter style electrical keyboard having keys corresponding to each letter of the alphabet, each numeral and other selected symbols such as punctuation marks, or any other character or symbol to be displayed. Depression of a single one of the keys of alphanumeric keyboard 122 causes the production of corresponding digital code which is relayed back to control unit 106. One such keyboard which will fulfill this function is described in U.S. Pat. No. 3,921,166, issued Nov. 18, 1975 to John W. Volpe and assigned to the present assignee.

A second keyboard is provided in the form of programmed function keyboard 121. Each key within programmed function keyboard 121 performs a predetermined function within the advertising copy layout as indicated by an adjacent label upon programmed function template 127. For example, one such function may be to flow a selected copyblock between a chosen set of lines. Upon depression of a key within programmed function keyboard 121 corresponding to that function, an indicated copyblock would be automatically positioned between the selected lines with each line automatically positioned a predetermined distance from the left-most boundary.

It has been found that for advertising copy layout many more keys are desired for performing such functions than is ordinarily convenient to provide. It has also been found that certain of these types of function keys are needed only for a predetermined portion of the advertising layout sequence while others are generally required throughout the entire operation. Thus, in accordance with the invention, plural programmed function templates 127 are provided. Each template is labeled according to the functions performed by the keys within programmed function keyboard 121 when that template is used. Each of these templates is formed as a metallic or rigid plate with apertures therein through which may extend the keys of programmed function keyboard 121. A knob, slot, or other means is provided for an operator to lift off each template and to replace it with another. Preferably, some of the keys perform the same function for each template while others perform a different function according to the template used. The functions which change with each template are preferably grouped upon the templates according to their use within the sequence of advertising composition so that changes in templates are minimized throughout the sequence.

Figure 3:
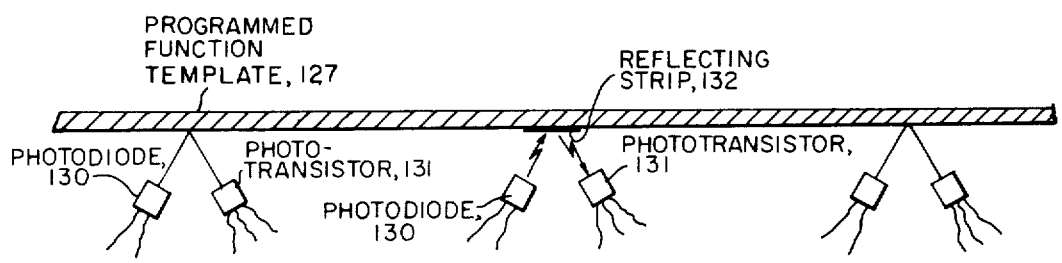
FIG. 3 is a cross-sectional view of the programmed function template of the operator controls shown in FIG. 2.

Each programmed function template 127 is encoded as shown in the cross-sectional view of FIG. 3. A plurality of photodiode 130 and phototransistor 131 pairs are provided attached permanently to CRT display unit 104 so as to lie immediately under predetermined portions of the rear side of a programmed function template 127 while in place upon programmed function keyboard 121. The regions of the rear side of programmed function template 127 immediately above the photodioide-phototransistor pairs is colored black so as to be non-reflecting unless a reflective mirror or strip 132 is placed there. Each photodiode 130 produces light of a wavelength which may be detected by the corresponding phototransistor 131. Should the adjacent portion of the rear side of programmed function template 127 be black the light emitted by photodiode 130 is substantially absorbed. The corresponding one of phototransistors 131 receives then substantially no light and, upon proper biasing, produces an output voltage corresponding to a logical 0. On the other hand, should reflecting strip 132 cause reflection of light from a photodiode 130 to a corresponding phototransistor 131, an output voltage will be produced which corresponds to a logical 1. The output logic signals produced by phototransistors 131 are coupled back to control unit 106 in a manner to be described. Each different programmed function template 127 is encoded thusly with corresponding patterns of logical 1's and 0's in accordance with the placement of reflecting strips 132 and black colored areas. With the knowledge of which programmed function template 127 is being used control unit 106 produces the corresponding preprogrammed functions.

Referring back to FIG. 2 there is also provided a trackball unit 120. Trackball unit 120 includes an operator-rotatable ball 124 which may be rotated in any direction. Rotation of rotatable ball 124 causes digital pulses to be produced in proportion to the amount of movement in each of X and Y axes. These pulses cause the movement upon the screen of CRT display unit 104 of a trackball symbol or cursor in accordance with the direction and amount of rotation of rotatable ball 124. As an example for use of trackball unit 120, the system may be so programmed that a copyblock selected or inputted by alphanumeric keyboard 122 is positioned at a start location indicated by the trackball symbol as positioned by operating trackball unit 120 in accordance with a command inputted from programmed function keyboard 121. There may also be provided a HOME key 125 depression of which causes the trackball symbol to return to the center of the display screen or another predetermined location. An ENTER key 126 may also be provided which causes the system to accept a new trackball data input.

Figures 4, 12:
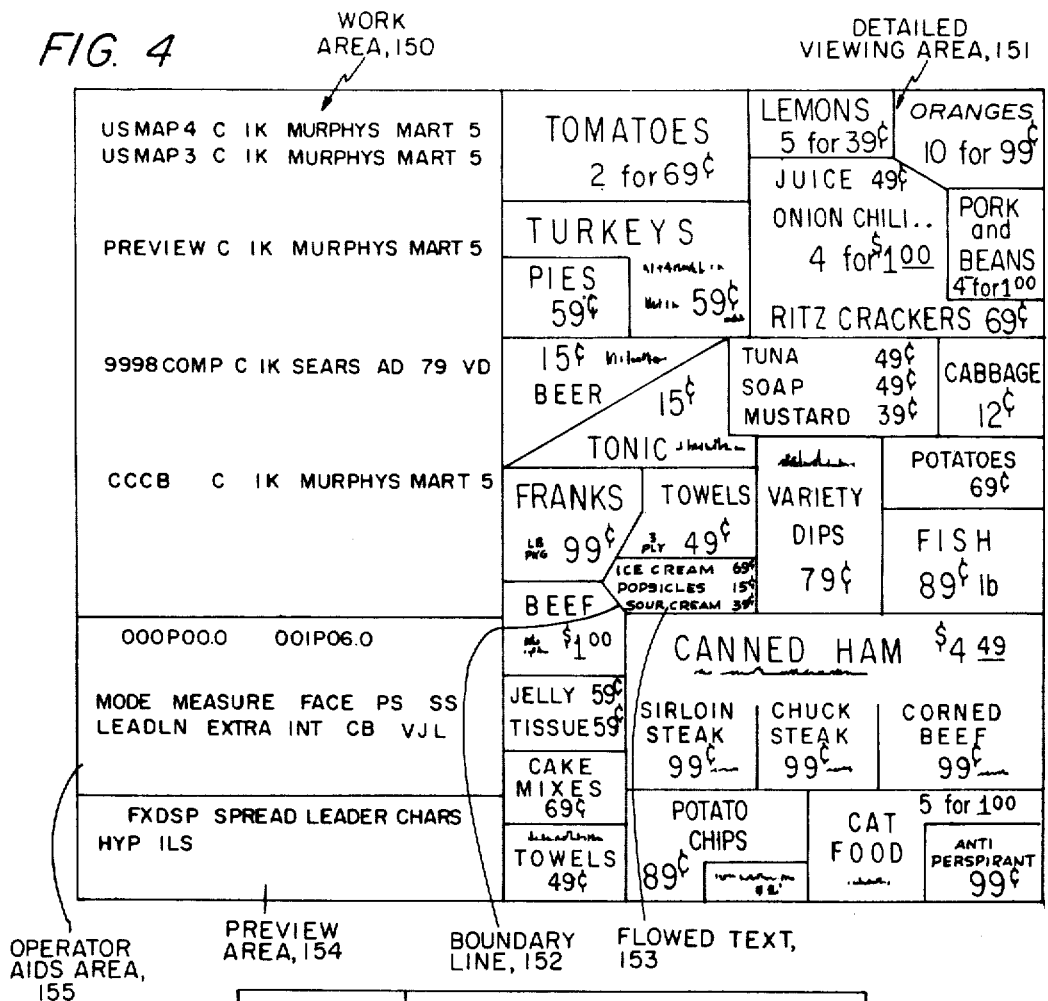
FIG. 4 is a representation of data, symbols, and lines as would be displayed upon the screen of a cathode ray tube in accordance with the invention.
FIG. 12 is a diagram used to explain the operation of the character image generator shown in FIG. 10.

Referring next to FIG. 4 there is shown therein a sketch of a typical data presentation upon the screen of a CRT display unit 104. The presentation is divided into four major areas: work area 150, detailed viewing area 151, operator aids area 155, and preview area 154. Upon initialization of the system, work area 150 displays a list of uncomposed or partially composed advertisements stored within the memory portion of control unit 106. To select one advertisement from the list of available advertisements, the operator positions a cursor symbol adjacent to the selected advertisement such as may be done by operating trackball unit 120, programmed function keyboard 121, or alphanumeric keyboard 122. The operator then presses a key of programmed function keyboard 121 which causes the display of the selected advertisement or at least that portion which has been previously digitized and stored within the system within detailed viewing area 151. When an advertisement has been selected the listing of work area 150 becomes a listing of copyblocks with an identification number corresponding to each prewritten copyblock.

An operator may select a copyblock for manipulation in the same way that the entire advertisement is selected from an available list or, more simply, he may merely enter the number of the copyblock via alphanumeric keyboard 122 then depress a preselected key of programmed function keyboard 121. Once a particular copyblock has been selected, particular indicia concerning that block are displayed within operator aids area 155. For example, the type size selected and the style of the type, (standard or italics with the amount of slant,), the amount of spacing between lines in the copyblock, and the amount of indentation may be displayed. Other useful information such as the numerical position of the trackball within the advertisement boundaries which line of the copyblock is selected and the character then under the trackball symbol may also be displayed.

With this selected information, the operator may then position the copyblock as desired within detailed viewing area 151, make changes within the copyblock to the wording, type font and size, flow the lines of the copyblock within straight or irregular boundaries, or make any other desired changes. Boundary lines such as boundary line 152 may be produced either through graphic digitizer tablet 102 by moving the specially provided pen along the desired boundaries or by use of trackball unit 120. Boundary lines thus drawn may be used as boundaries for copyblock text or as an indicator to the paste-up personnel of where sketches or photographs should be positioned.

An operator may also enter new copyblock data which is to be added to the advertising copy. This is done by typing in the added material with alphanumeric keyboard 122 which then appears within preview area 154. Corrections may be made to the material within preview area 154 before it is moved to and positioned within the advertising copy as displayed within detailed viewing area 151. To move added textual material, an operator may position the trackball symbol with trackball unit 120 at the preferred start location then press a predetermined key of programmed function keyboard 121 causing the transfer.

The above recited functions performed by the system of the invention is for purpose of illustration only. Many other different kinds of functions may also be performed depending upon the programs used by control unit 106. It is advantageous that with the invention advertising composition may be done much more accurately and quickly than with previously known systems.

Figure 5:
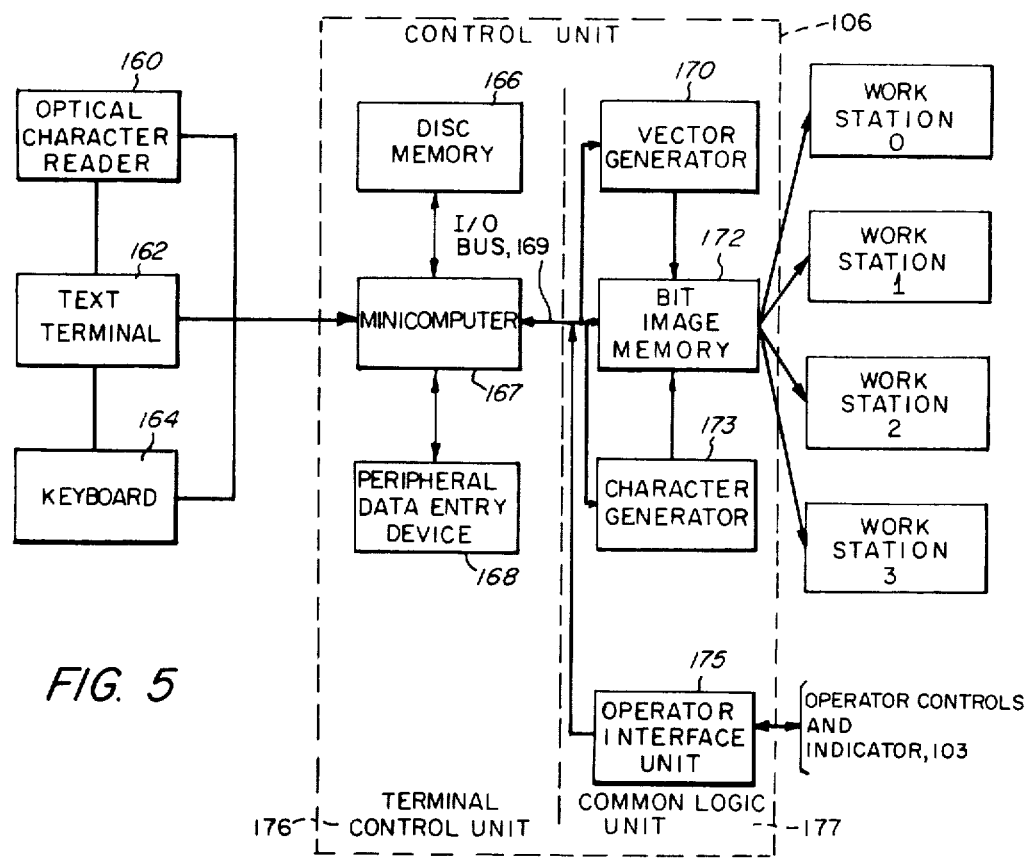
FIG. 5 is a generalized block diagram of a digital data and display system in accordance with the invention.

Referring next to FIG. 5, there is shown therein in block diagram form an advertising composition system in accordance with the invention. The text for the copyblocks is entered into the system through control unit 106 by one or more of several available external data entry devices. These devices include optical character reader 160, text terminal 162, and keyboard 164. The copyblocks entered as digital data at this point are ordinarily only in the form of text with no position within the advertisement specified. The copyblocks within a particular advertisement are identified only as to the copyblock to which they properly belong.

The digital data from optical character reader 160, text terminal 162, or keyboard 164 is first coupled into minicomputer 167 then stored upon disc memory 166 using well-known data storage techniques. The data thus stored is addressed by a number corresponding to each advertisement for which data is stored on disc memory 166 and by a number corresponding to each copyblock within an advertisement. Data relating to advertisements to be composed may also be entered via peripheral data entry devices 168 which may, for example, include a high-speed paper tape reader, magnetic tape unit, or teletype.

Also entered via peripheral data entry devices 168 are the software programs used to cause minicomputer 167 to perform various aspects of system operation. Included among these programs are ones for causing the transfer of data from optical character reader 160, text terminal 162, keyboard 164 and other data entry devices to disc memory 166. Other programs include those for manipulating data in response to commands from operator controls and indicators 103 at each work station 100 and it may further include algorithms for performing automatic hyphenation or similar operations useful in flowing text between predetermined boundary lines. The programs entered by peripheral data entry devices 168 may be stored either upon disc memory 166 or within a core memory within minicomputer 167 or within any of the number of well-known storage devices. Also stored upon disc memory 166 may be standard and specialized line patterns such as squares, rectangles, ellipses, and various polyhedron figures which are useful in producing the advertising copy. These are stored as sets of digital numbers representing the end points of individual line segments which make up the pattern.

Data control commands from operator controls and indicators 103 are assembled by operator interface unit 175 and communicated to minicomputer 167 after proper formatting through I/O bus 169. The digital signals input upon I/O bus 169 at this point represent the various symbols and characters typed in by an operator upon alphanumeric keyboard 122 as well as the programmed function commands produced by programmed function keyboard 121 and further includes digital numbers representing the rotation or position of the trackball symbol as produced by trackball unit 120. These control signals, relayed by operator interface unit 175, actuate selected portions of the stored programs and furnish input data required in executing the stored programs.

Data produced and assembled by minicomputer 167 to be displayed upon the CRT display units 104 of work stations 100 is coupled to I/O bus 169 where it is further coupled to vector generator 170, BIM (bit image memory) 172, and character generator 173. BIM 172 contains a complete representation therein of all the data displayed upon the CRT display units 104 of each of work stations 100. BIM 172 may be divided into predetermined sections with each section servicing a predetermined one of work stations 100. The display screen of the CRT display units 104 of each work station 100 are divided into a matrix of display points with all points falling upon raster scanned lines. For example, in a preferred embodiment, there are 1,024 display positions in the matrix along both X and Y axes. Each display position or point within the matrix is represented by a binary bit within BIM 172. This bit may be set in either of two logical states one of which represents a blanked or low light output condition for the corresponding point upon the CRT screen while the other represents an unblanked or condition of higher light intensity. Characters, lines, and geometrical patterns are thus displayed upon this screen of one of CRT display units 104 by storing patterns of logic bits within BIM 172 corresponding to the form of the character, line, or geometric pattern to be displayed and refreshing the CRT display unit 104 directly from BIM 172 by reading out the data stored therein in sequence with the generation of the raster scanned pattern used to refresh the display unit. Characters, lines, and geometric patterns may be stored either as light intensified portions against a darkened background or as darkened portions within a light background. The latter is preferred for long time viewing.

In previously known systems, data for refreshing the display units was stored most commonly in a storage tube. The data storage capabilities and resolution of such tubes limited the amount of data which could be displayed and the minimum size of characters which could be used. Systems using such tubes for display refresh were also limited in speed as data could not be changed within the memory during ordinary refresh operations. Moreover, such tubes are clearly less reliable than digital devices thereby lowering the overall reliablity of systems employing them.

Other systems used a digital refresh memory in which were stored the end points of lines and the codes corresponding to characters to be displayed. No actual images of these were stored. During each refresh cycle it was necessary to produce each image pattern. As apparatus for producing these patterns operates relatively slowly, the total number of lines, characters, and patterns which could be displayed was severely limited.

Vector generator 170 and character generator 173 also receive data from minicomputer 167 and I/O bus 169. Vector generator 170 receives as inputs the beginning and end points of lines to be drawn upon the screen of one of CRT display units 104. These end points correspond to two bit positions with corresponding addresses within BIM 172. Vector generator 170 calculates the positions of adjacent dots corresponding to particular bit locations within BIM 172 which, displayed together, produce the desired line. The requisite bits within BIM 172 are set by the outputs of vector generator 170 in the state corresponding to display conditions. For example, if the logical 1 state corresponds to a darkened screen matrix point and it is desired to display lines and characters as darkened dot patterns, logical 1 bits are set within BIM 172 as addresses corresponding to positions along the length of the line.

Character generator 173 receives inputs in the form of character codes corresponding to character or symbol patterns to be displayed. Also furnished are control bits which determine the size and font style of each character. Character generator 173 then alters the basic character pattern stored therein in accordance with these codes and transfers the character image into BIM 172 as a corresponding pattern of logical 1's and 0's.

It is to be noted that with the invention only one vector generator and character generator need be supplied to service a plurality of work stations and CRT display units. Also, the line and character or symbol patterns need be produced only once for each character or line input as contrasted with previous systems in which the line and character or symbol patterns had to be produced once each refresh cycle. Therefore, systems constructed in accordance with the teachings of the present invention are able to display much larger amounts of data than were previous systems. Systems in accordance with the present invention are also able to reproduce characters having a smaller size with greater clarity than was possible with systems using storage tube memories for display refresh.

Figure 6:
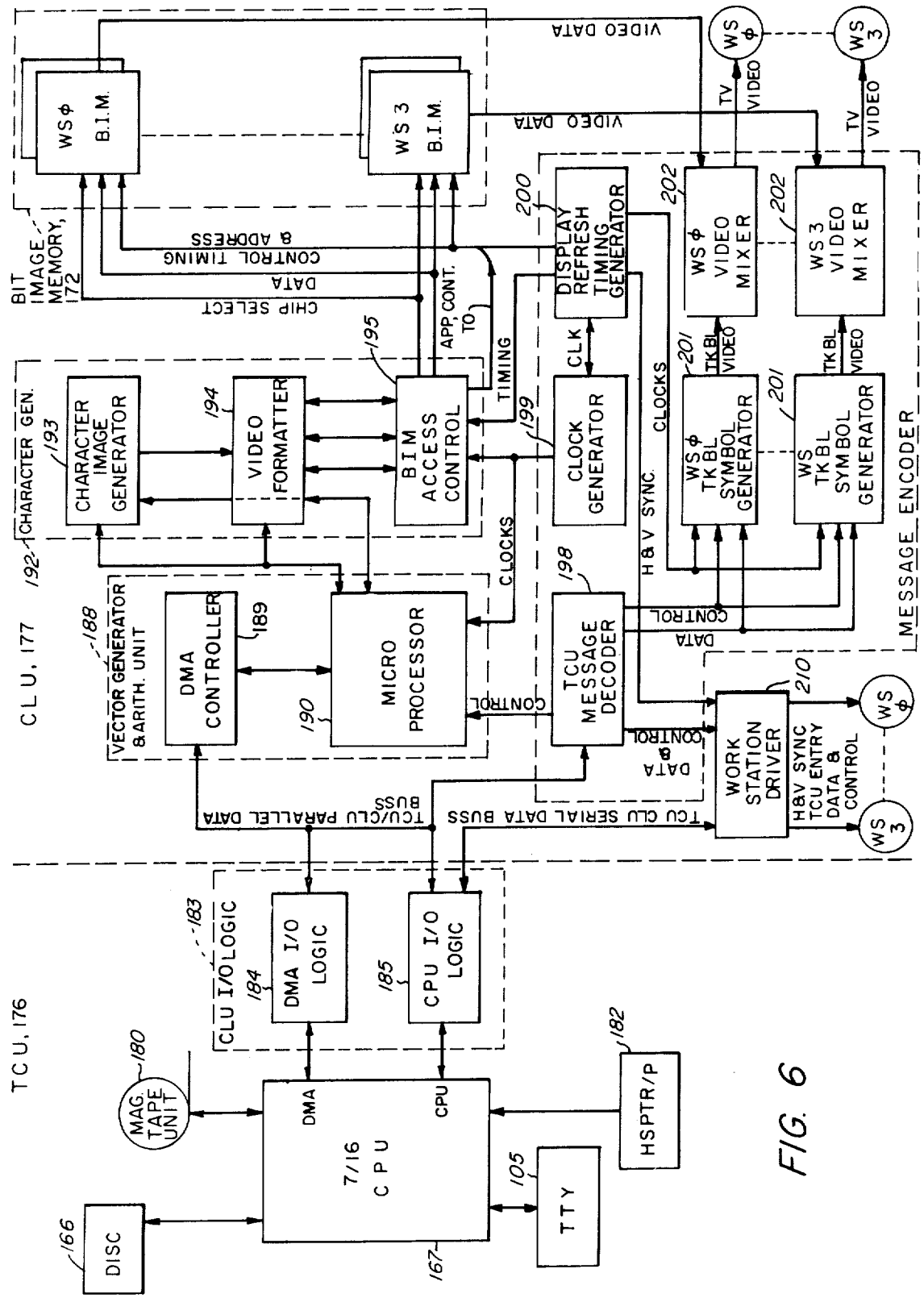

Referring next simultaneously to FIGS. 6 and 7 there is shown therein a more detailed block diagram of the system shown in FIG. 5. Minicomputer 167 is shown with disc memory 166 connected thereto along with peripheral data entry devices 168 which here include magnetic tape unit 180, teletype 105, and high speed paper tape reader and punch 182. The latter two may be connected to a multiplexer bus input of minicomputer 167 while the former two are preferably coupled to the memory bus therein.

I/O bus 169 as shown in FIG. 5 here includes both parallel and serial portions. Input and output between the parallel and serial buses to and from the minicomputer 167 is controlled by CLU (Common Logic Unit) I/O logic 183. CLU I/O logic 183 includes DMA (Direct Memory Access) I/O logic 184 and CPU (Central Processor Unit) I/O logic 185. DMA logic 184 communicates data to and from the memory bus within minicomputer 167 while CPU I/O logic 185 communicates with the CPU registers. For minicomputer 167 and Interdata Corporation Model 7/16 minicomputer may be used, that computer having the required CPU and DMA bus access for use with the system of the invention. DMA logic 184 includes registers for retiming data passed in both directions along the parallel data bus and also includes driver circuitry for producing output signals of appropriate voltage levels. The primary parallel path for transfer of data representing lines and characters to be displayed is through DMA I/O logic 184 while the sole path for control communications between TCU (Terminal Control Unit) 176 and CLU 177 is through CPU I/O logic 185.

For generations of lines, characters, and all geometric patterns minicomputer 167 produces output data words having two component parts. The first of these parts is an opcode which indicates the type of word and hence type of operation to be performed. The opcode is transferred via CPU I/O logic 185 to TCU message decoder 198. The data portion of the word is transferred directly from DMA I/O logic 184 to DMA controller 189 within vector generator and arithmetic unit 188 and thence to microprocessor 190.

The types of messages which may be sent from TCU 176 to CLU 177 include the following:

1. Load Device Address. This instruction addresses BIM 172 directly. BIM 172 is instructed to receive and load data from DMA I/O logic 184 via DMA controller 189, microprocessor 190, video formatter 194, and BIM access control 195. BIM 172 will load the data at the address specified within the word. BIM 172 will continue to receive and load data until a second load device address word is sent.

2. Write Fixed Format Character. This instruction causes the character generator to send to BIM 172 at a specified location therein a character pattern as specified by data bits within the word. The character is of a preselected fixed size which cannot be altered by other size or font determining commands.

3. Load Character Point Size Register. This message specifies the point size or dimensions of the characters to be printed to an integer number of points corresponding directly to actual print point sizes. The bits of this message are stored within an appropriate register within vector generator and arithmetic unit 188 to control the height and type of the characters within the next character write operation.

4. Load $X_0$ Register. This command causes a register within vector generator and arithmetic unit 188 to be loaded with the X starting position of the next line or character.

5. Load $Y_0$ Register. This command performs the same function as above but for the Y axis.

6. Load Character Set Width Register. Receipt of this message causes the width register within the character generator to be set with the width specified within the message.

7. Write DVA. This message includes both a character code and an X axis spacing. The character specified is written next to the previously written character at the specified distance.

8. Jump and Store Return. This instruction causes the current DMA address +1 to be saved in a holding buffer within TCU message decoder 198 along with other control information such as the currently addressed BIM and other status information for future use.

9. Jump To Graphic and Return. This message causes the next instructions for generation of characters, lines, or geometric patterns to be read from minicomputer 167 starting at the memory address specified in the word type immediately above. CLU 177 will then continue to extract its instructions and data words from minicomputer 167 in address sequence. Data words will continue to be thus extracted until a RETURN instruction is received.

10. Execute Transfer Function. One of five different functions may be performed depending upon a specified function code.
   a. Write Line. A line is written between the last two received end points ($X_0$, $Y_0$).
   b. Erase Line. A line is erased between the last two received end points. End points may be specified with load $X_0$ register or load $Y_0$ register commands.
   c. Write Raster. A raster, a solid rectangular figure is displayed with opposite corners specified by load $X_0$ register and load $Y_0$ messages.
   d. Erase Raster. Receipt of this instruction causes a raster which was previously written to be erased.
   e. Italic Select. The characters which are written following receipt of this type of word are written with an italic slant of an angle specified by control bits within the word.

Each of these message types is decoded by TCU message decoder 198 which produces output control signals to microprocessor 190 and work station driver 210 and trackball symbol generators 201 in accordance with the data type decoded. The larger portions of the operations specified by these control words as decoded by TCU message decoder 198 are performed within vector generator and arithmetic unit 188.

All input data into CLU 177 must pass first through DMA controller 189 within vector generator and arithmetic unit 188. Microprocessor 190 within vector generator and arithmetic unit 188 performs several distinct data display functions. From the supplied end points of lines it computes the addresses with BIM 172 which are set in the logic condition corresponding to active display along the length of the line. Scaling functions for all displayed characters as well as italics generation are also produced therein. Moreover, character codes furnished to character image generator 193 within character generator 192 are also relayed as well as data which is intended to be read directly into BIM 172 from minicomputer 167.

Character generator 192 has three major components: character image generator 193, video formatter 194, and BIM access control 195. Character image generator 193 includes a random access memory (RAM) which stores bit patterns corresponding to each character or symbol within the system's repertoire of characters and symbols. This RAM is loaded upon system initialization from disc memory 166 through minicomputer 167, CLU I/O logic 183, DMA controller 189, and microprocessor 190. This data need be entered within the RAM within character image generator 193 only once for each system initialization. Data for character images need not be transferred from a central processor or computer for each refresh cycle as in some other previous systems. Scaling and italicization of characters is performed through interaction between microprocessor 190 and character image generator 193 in a way to be described.

Video formatter 194 prepares character and line data from character image generator 193 and microprocessor 190 respectively for input to BIM 172 through BIM access control 195. The source of the data to be formatted is determined by the opcode as decoded by TCU message decoder 198. All X and Y positions, memory select signals and all video type identification signals are furnished to video formatter 194 from microprocessor 190.

BIM access control 195 controls the writing in and erasing of data within BIM 172 by video formatter 194. From the timing signals produced by display refresh timing generator 200 BIM access control 195 determines the appropriate time within a refresh cycle at which data from video formatter 194 may be entered within BIM 172. Feedback signals from BIM 172 to BIM access control 195 also determine when data may be entered or erased.

Clock generator 199 produces output clock or timing signals of predetermined frequencies for operating display refresh timing generator 200, microprocessor 190, and BIM access control 195. From these clock signals display refresh timing generator 200 drives horizontal and vertical sync pulses for synchronizing the generation of the raster upon each CRT display unit 104. These horizontal and vertical sync signals are relayed through work station driver 210 through cables to each work station 100. Display refresh timing generator 200 also produces timing or clock signals for operating trackball symbol generators 201, one of which is provided for each work station 100. The trackball symbol is the only video information which is not displayed via BIM 172. Activation of trackball symbol generators 201 is made by TCU message decoder 198. The trackball symbol, preferably a simple cross-hatch, is generated at a time determined by the input timing signals from display refresh timing generator 200. The trackball symbol video signals are added to the video data signals produced by BIM 172 by video mixers 202 and coupled therefrom to work stations 100.

The control signals to and from each work station 100 are relayed through work station driver 210. Therein are contained driver circuits which are capable of driving signals over cables of the required length. Termination impedances are also provided therein for received signals from each work station 100.

Within work station 100 CRT display unit 104 produces a raster display in response to horizontal and vertical sync pulses produced within CLU 177. The video signal produced by video mixers 202 causes the modulation of the light intensity along the raster scanned lines producing the character, line, and raster patterns thereby. CRT display unit 104 may be any one of a number of commercially available units such as Ball Brothers Company (Minneapolis, Minnesota.) TV Monitor Model THC-25/R.

Operator controls and indicators 103, including the alpha-numeric keyboard 122, programmed function keyboard 121, and trackball unit 120 produces digital signals which are to be relayed back to minicomputer 167 for control of program operations. Graphic digitizer tablet 102 also produces digital signals which must be relayed back to minicomputer 167. Each key depression, change in position of trackball unit 120, or movement of the graphic digitizer tablet pen causes the production of a digital signal which is sampled and stored within registers within work station I/O logic 212. When minicomputer 167 is prepared to receive new data from work station I/O logic 212, a polling signal is sent through CPU I/O logic 185 and work station driver 210. Upon receipt of the polling signal, work station I/O logic 212 transmits the newly entered data stored therein in serial fashion back through work station driver 210 and CPU I/O logic 185 to minicomputer 167. As data entered into the registers of work station I/O logic 212 is in the form of parallel binary bits a conversion to serial form is made. This may be done by entering the data in parallel into a shift register then, upon receipt of the polling signal, shifting the data out in serial fashion. Work station I/O logic 212 includes signal drivers capable of driving the signals sent to work station driver 210 along the length of cable employed.

Figure 8:
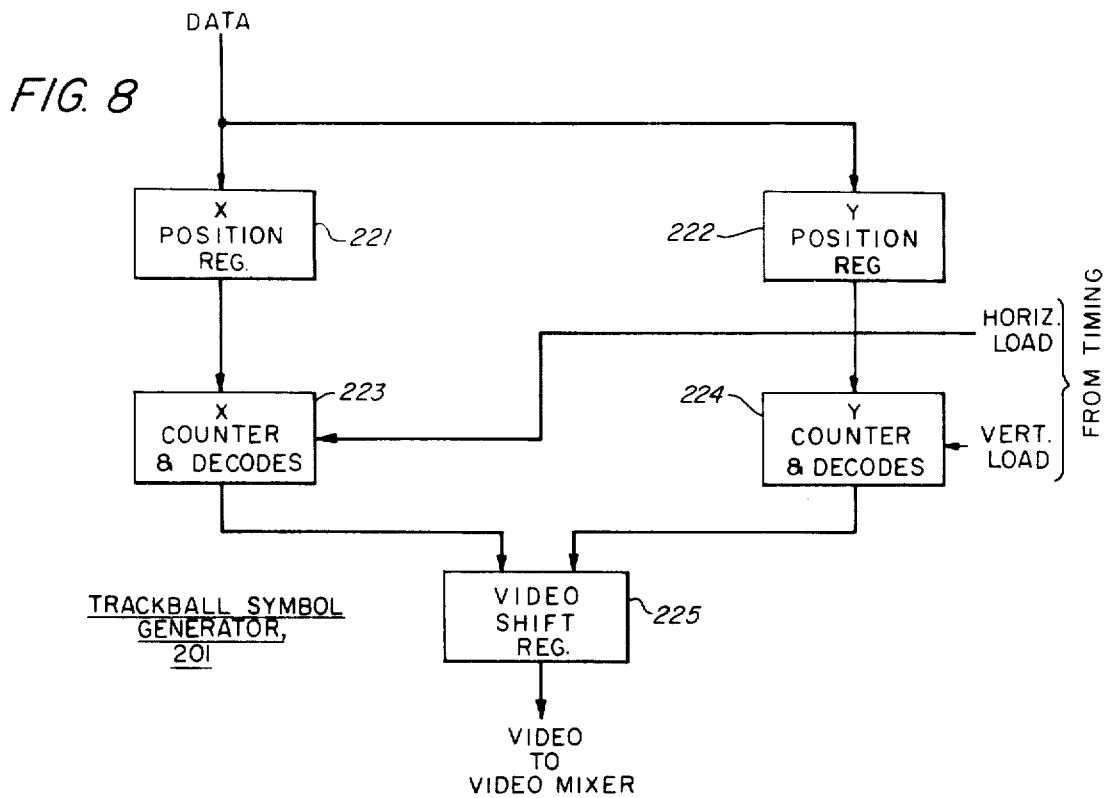
FIG. 8 is a diagram of one of the trackball symbol generators of the system shown in FIG. 6.

Referring now to FIG. 8 there is shown therein generally at 201 a diagram of one of trackball symbol generators 201 of the system shown in FIG. 6. The X and Y positions from trackball unit 120 are loaded respectively into X and Y position registers 221 and 222. These registers are cleared and reset to X and Y positions corresponding to the center of the display screen when the HOME key 125 of trackball unit 120 is pushed. The position upon the display screen of the CRT beam is computed by X and Y counters and encoders 223 and 224 from the horizontal and vertical load pulses produced by display refresh timing generator 200. When the difference between the trackball position and the current position of the CRT beam is within a predetermined range of values for either axis, X and Y counters and decoders 223 and 224 produce a logical 1 output signal. These output signals are loaded into video shift register 225 on a continual basis then coupled to video mixer 202 for addition with the video signal produced by BIM 172. In this manner, a trackball symbol is produced upon the display screen having the form of a cross-hair having vertical and horizontal segments.

Referring next to FIG. 9 there is shown a block diagram of character generator 192 with its connections shown to other portions of the system. Upon initialization of the system, character pattern data originally stored upon disc memory 166 is loaded via accumulators within microprocessor 190 into a RAM within character image generator 193. The character patterns are in the form of a 20 × 18 bit matrix of binary bits where, for example, a logical 0 indicates a video level the same as the background level upon the CRT screen and a logical 1 indicates a change in that level either to a more or less intense light output. The 18 × 20 bit character image patterns are transferred into the RAM within character image generator 193 and a series of eighteen 20-bit words. Sixteen of these come from a first accumulator while four are transferred from a second accumulator within microprocessor 190 of vector generator and arithmetic unit 188. Control data signals from microprocessor 190 are also coupled to video formatter 194 and to microprocessor command decoder 245 where they are stored for use within character image generator 193. Decoded opcode information from TCU message decoder 198 is also stored within microprocessor command decoder 245 for use in controlling the size and font characteristics of generated characters. Character image generator 193 produces a digital video signal which is coupled through video formatter 194 which in turn relays the signal to BIM 172 through BIM access control circuit 195 at appropriate memory load times.

Figure 11:
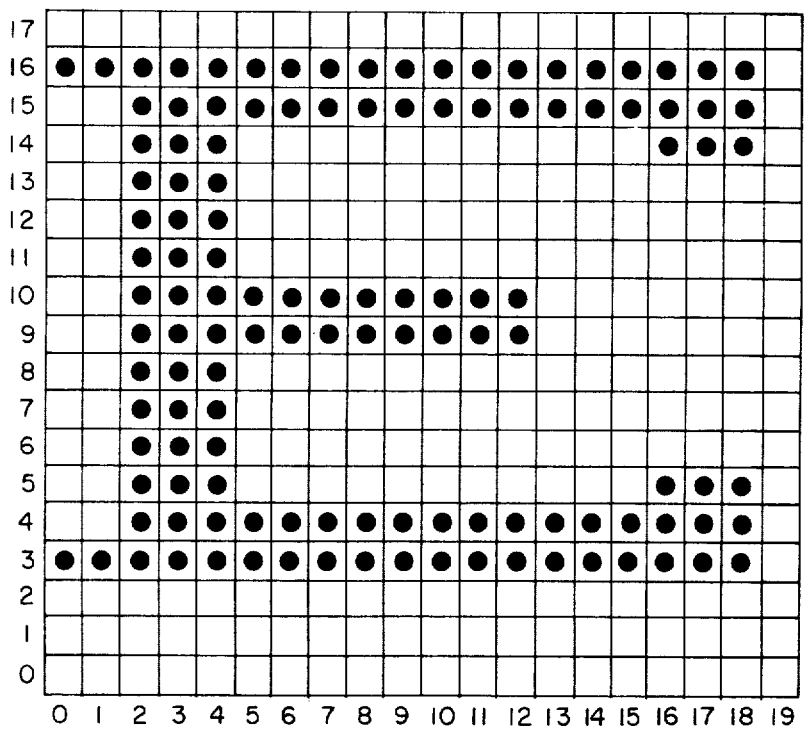
FIG. 11 is a diagram of a letter "E" as would be displayed with the present inventon.

FIG. 11 is a representation of a character "E" such as would be stored upon disc memory 166 and within the RAM of character image generator 193. This pattern shows the character as it would be displayed upon the screen of one of CRT display units 104 for a fixed font size character. Each row of dots would be displayed upon one raster scanned line with the dots representing portions of the raster lines which are varied in intensity from the background level. A darkened dot may represent a logical 1 within the binary matrix for each character while a blank space indicates a logical 0 although the opposite coding scheme can be used.

Upon system initialization such as when power is first turned on, data address RAM 254 is loaded with all character patterns within the system's repertoire. To accomplish this function, address counter 252, which is a binary counter, is reset to the 0 state. The first 20-bit byte of data is then loaded into data address RAM 254 upon application thereto of a clock pulse strobe. Address counter 252 is then incremented to the 1 state and the next 20-bit byte of data loaded. This operation continues until all character patterns have been completely loaded with data address RAM 254. Alternatively, data address RAM 254 may be replaced by a permanently programmed read-only memory in which are stored the character pattern repertoire. However, the present system is preferred using a RAM as the character patterns can be changed without having to change memories.

To write a fixed format size character into BIM 172 without scaling of the width or height of the character, the character patterns are read out of data address RAM 254 one 20-bit byte at a time preferably starting from the bottom line of the character. To initiate a character generation operation, data address RAM 254 is addressed with the address location of the lower line of the first byte of the selected character. This address is furnished from the accumulators of microprocessor 190 through multiplexer 250. The address thus furnished is jammed into address counter 252 causing it to begin counting in sequence from this address number. The digital character patterns are thereby read out of data address RAM 254 one 20-bit byte at a time as address counter 252 sequences through eighteen counts starting at the furnished address. The 20 output lines each representing one bit of data from data address RAM 254 are coupled to twenty of the inputs of multiplexer 258. The 20 input lines to multiplexer 258 are coupled therethrough one at a time to the single output line in response to the select input thereto furnished by the accumulator of microprocessor 190 coupled through multiplexer 250. The serial video bit stream produced thereby is assembled by video formatter 194 and read into BIM 172 at the appropriate BIM cycle time corresponding to the predetermined character location.

From the single dot matrix representation of each character stored within data address RAM 254 the character generator system in accordance with the invention can produce characters of any required size ranging from typically 7 points to 96 points upon a display screen of approximately 14 × 14 inches having 1,024 raster scan lines. The width of the characters may also be similarly varied. Most generally, the dot matrix representations of a character that is to be scaled from its stored size value is stretched or reduced independently in vertical and horizontal axes to achieve the required height or width. This is done basically by the deleting rows or columns of dots to shrink the characters in size or reading out the same row or column more than once in order to increase the character size. For characters smaller than a predetermined minimum size other operations are performed in addition to the mere deletion of rows or columns of dots in order to increase the legibility.

To scale a character in height, microprocessor 190 calculates its scale factor $\Delta H = 18$/character height (in points). $\Delta H$ is added to the start address for the selected character for each row of dots to be displayed. The integer portion of the accumulated total is transmitted through multiplexer 250 and jammed into address counter 252 to provide a direct address to data address RAM 254 from the accumulator registers of microprocessor 190. Only the integer bits are thus used although fractional bits within the accumulated sum are retained and used in the computation of succeeding addresses. For example, for an 18-point character height $\Delta H = 1$ and each row of the dots is used. For a character height of 36 points $\Delta H = 1/2$. For this case, as the address is computed, the integer portion of the calculated address will be the same for two successive addresses although the fractional part changes. Thus, since only the integer portion of the accumulated total is used as the character address, each row of stored data will be used twice in presenting the character. For a character height of 9 points $\Delta H = 2$. The calculated addresses for this case thus skip every other integer value and hence every other row of dots stored within data address RAM 254 producing a character of half the standard format height.

A similar function is performed for reducing or increasing the width of characters with the exception of special operations performed on characters having widths less than 7 points to increase their legibility. A width scale factor $\Delta W = 20$/character width (in points) is calculated by microprocessor 190. $\Delta W$ is calculated to an accuracy of nine bits, four integer bits and five fractional bits. The four integer bits are coupled through width decoder 260 and set into width register 262 with a load pulse from microprocessor 190 at the same time that the initial address code is transmitted. If the most significant bit of the four most significant bits is a 1, the point size is 8 or larger. For a most significant bit of 0, the point size is 7 or smaller. The most significant of the integer portion of $\Delta W$ is coupled from width register 262 to a select input of multiplexer 250. For character point sizes of 8 or larger, this select line causes five bits from a first accumulator of microprocessor 190 to be selected as the select code input to multiplexer 258. For character widths less than 7 points, this select line causes the output of read-only memory 264 to be chosen as the select input to multiplexer 258. In the case that the output of the first accumulator is selected as the select input to multiplexer 258 the generation and output of character patterns proceeds much in the same fashion as for characters of changed height with the exception that the accumulator output selects which data bits among the columns of bits form the output at a particular bit output time. For example, for $\Delta W = 2$ only every other column of bits within each row of bits is selected producing a character of half the standard format size. For $\Delta W = 1/2$, each column within each row will be selected twice in succession. For each row of dots a select number is computed starting from 0 for the first column of dots within the row and adding the full 9-bit value of $\Delta W$ each time. This is performed with the first accumulator of microprocessor 190.

For characters of widths less than 7 points, the select number to multiplexer 258 is formed by the output of read-only memory 264 in accordance with the chart shown in FIG. 12. In accordance with the chart of FIG. 12 for character widths less than 7 points, other output signals are made available for selection at the input multiplexer 258. These additional signals are produced by logically OR-ing together preselected ones of the 20 output data lines from data address RAM 254. Read-only memory 264 is addressed with a 6-bit number the first three most significant bits being the three least significant bits of the integer portion of $\Delta W$ and the three least significant bits being a count produced by the N-counter of video formatter 194. This count is equal to one less than the width point size at the start and is incremented by one for each column to be selected.

Referring to the Table shown in FIG. 12 for character slug width of 8 points, data bits in columns 0, 3, 5, 8, 10, 13, 15, and 18 are selected and sent to the video formatter for each selected row. These would be the numbers sent from the accumulator as the outputs from RAM 254 are not used in the case of character widths of 8 points. For a character having a width of 7 points, the outputs from RAM 254 first select columns 0, 3, and 5. Then read-only memory 264 produces an output number 20. This number used as the select input to multiplexer 258 causes one of the eight outputs from video decoder 256 to be selected as the output line to video formatter 194. The selected output from video decoder 256 is formed as the logical OR between column bits 8 and 10 of each row. The outputs from read-only memory 264 then select in succession column bits 13, 15, and 18.

As another example for a character width of 4 points, read-only memory 264 produces an output of 22 for the first bit selection. Output number 22 corresponds to an OR-ing of column bits 0, 3, and 5 as produced by video decoder 256. The outputs of read-only memory 264 then select in succession columns 8, 10, and an OR-ing of columns 13, 15, and 18 selected by an output number 26. For a character slug width of 1 point, it has been found that the character is too small to be legible at all for the specified screen dimensions and number of scan lines. Consequently, all of the appropriate column bits are OR'd together to produce an output signal bit should any one column bit be in the 1 state. The character will be presented simply as a vertical line.

Figure 14:
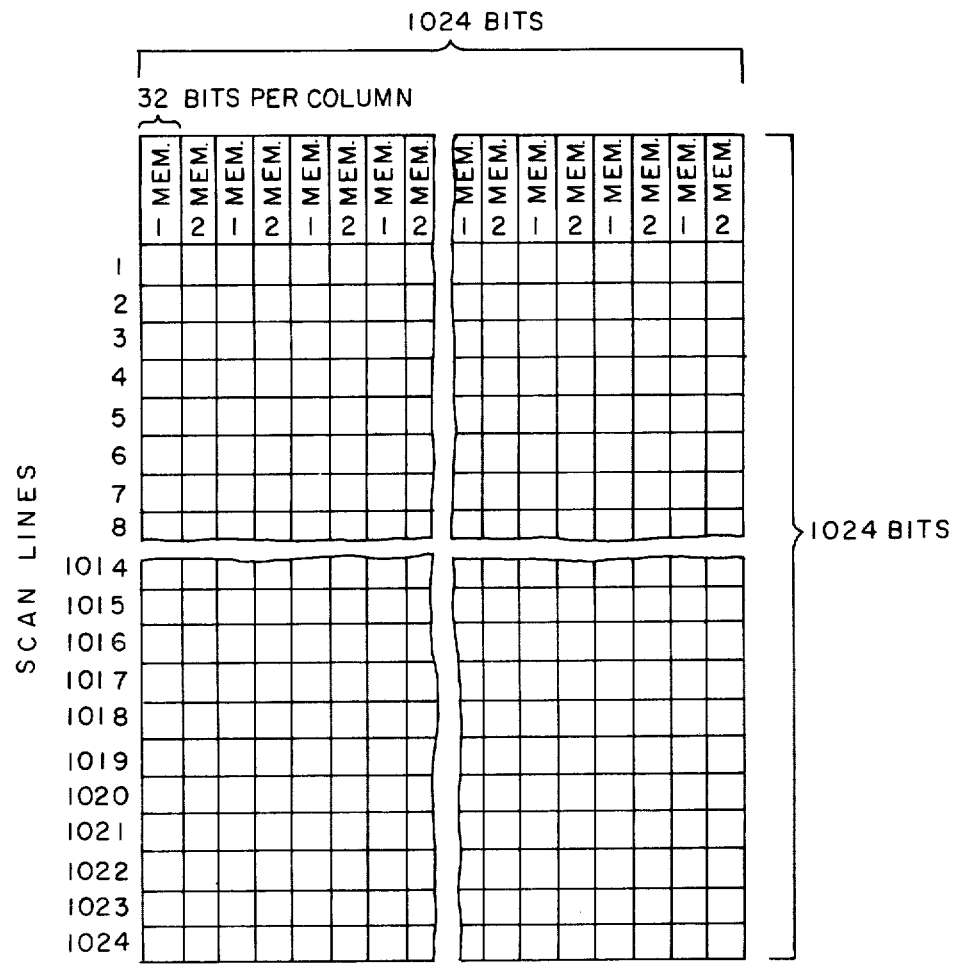
FIG. 14 is a diagram used to explain the operation of the bit image memory of the system shown in FIG. 6.
Figure 15:
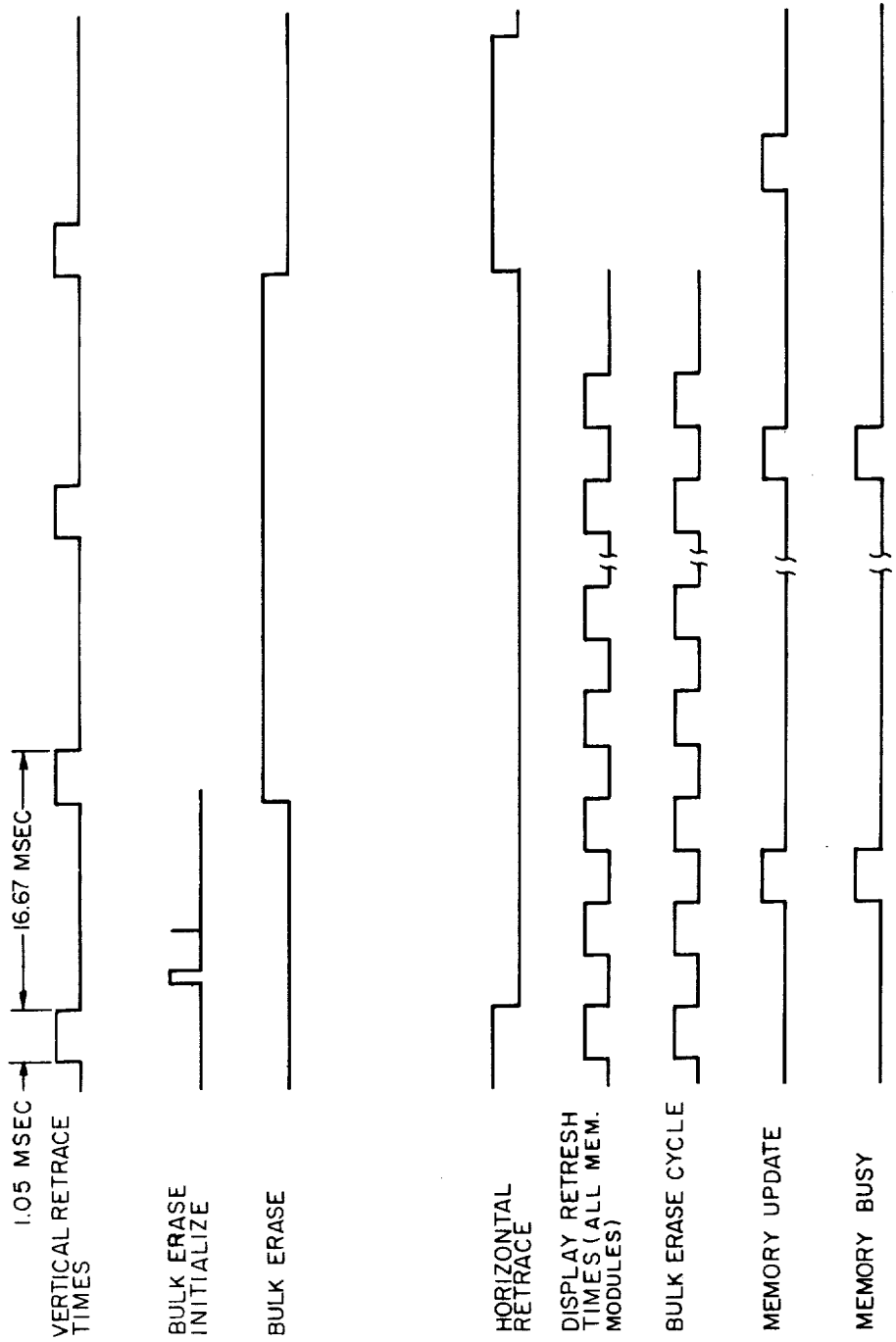
FIG. 15 is a timing diagram of the bit image memory of the system shown in FIG. 6.
Figure 18:
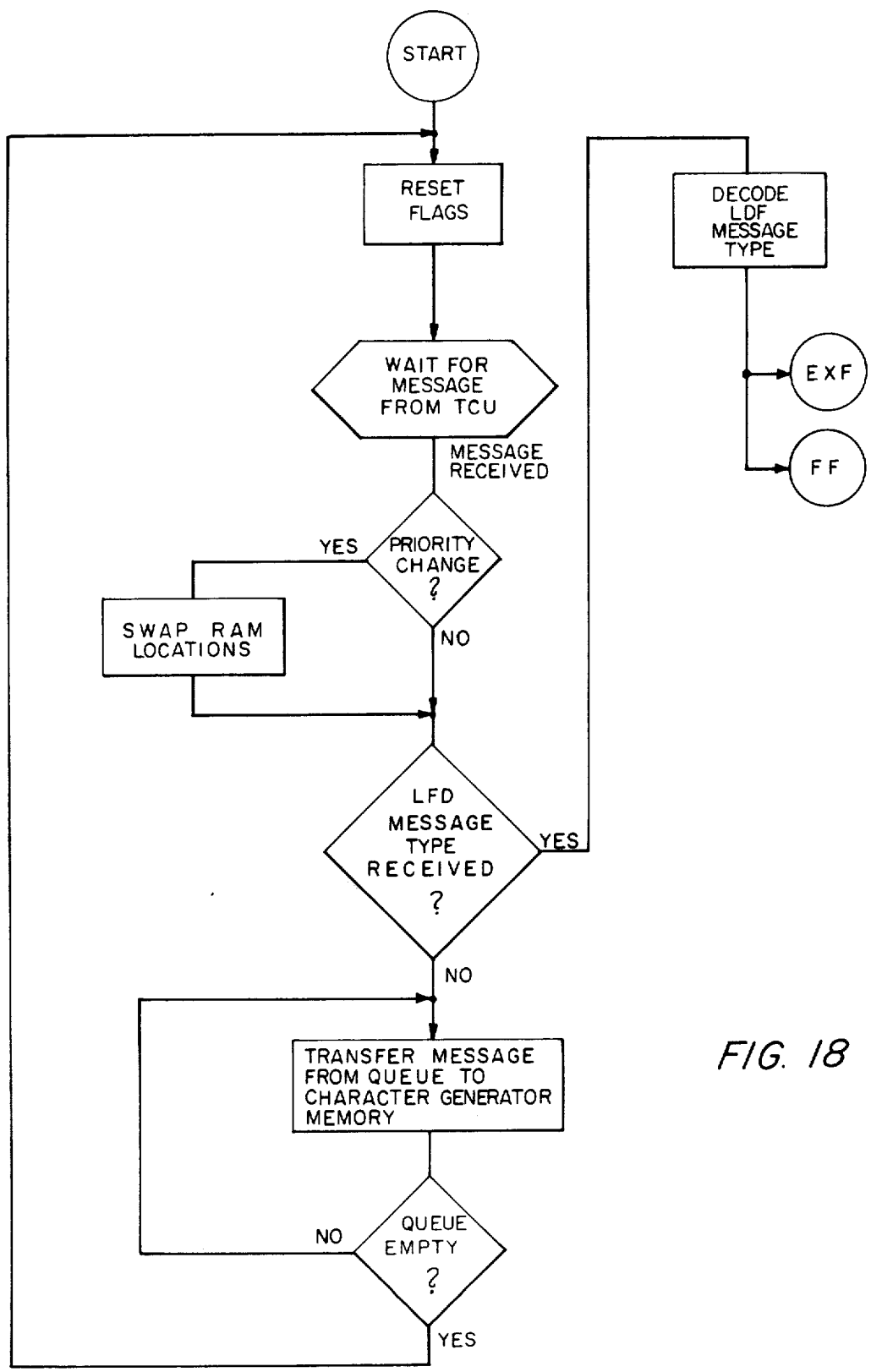
FIGS. 18–29 are flow diagrams used to explain the operation of the microprocessor shown in FIG. 17.
Figure 19:
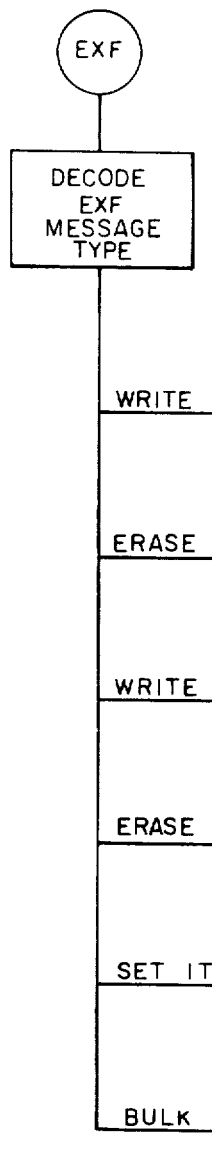
Figure 20:
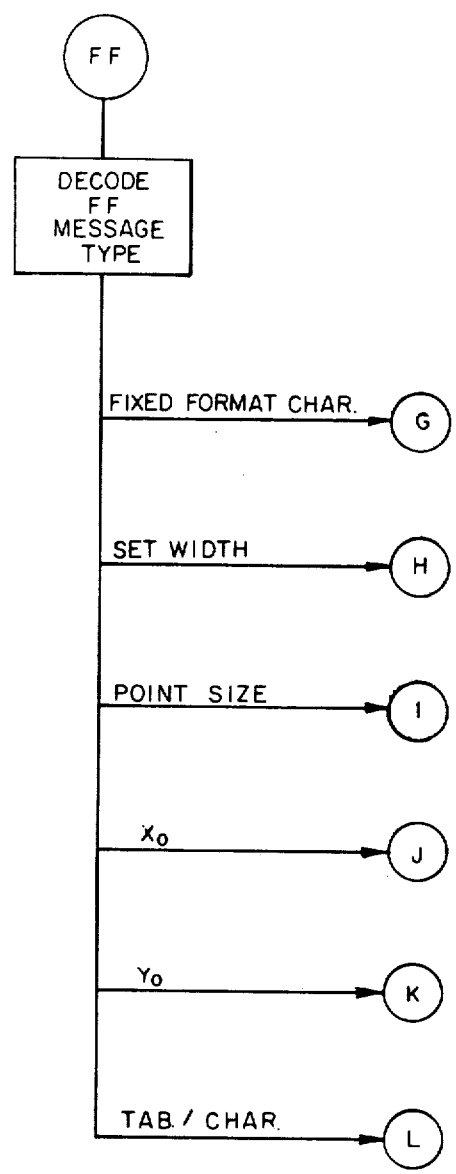

Referring next to FIGS. 13–15 the operation of BIM 172 and its structure will now be explained. As shown diagrammatically in the view of FIG. 14, data is supplied for generation of the video points along each scan line alternately between two memory modules within BIM 172. Two such memory modules are provided for each CRT display unit 104 within each BIM 172. Along each scan line memory module 1 supplies the first 32 bits and each succeeding odd numbered 32-bit segment. Memory module 2 supplies the second and all even-numbered segments. Each 32-bit segment is presented serially to the video mixer to provide a continuous single-bit data stream video signal.

In FIG. 13 is shown a schematic diagram of one memory module 281 within BIM 172. The memory is preferably organized as a 4 × 32 chip matrix of 1 × 4,096 bit MOS RAM memory chips. Each memory chip 280 has a 12-bit address input with input address signals designated AO–ALL. Each memory chip 280 also has two enable inputs designated CS and CE. Memory chips 280 further include a single serial data input designated DI and an open collector-type single data output designated DO. The DO outputs of each column are interconnected as are the DI inputs and the column select enable CS. The row enable signals CE are interconnected among all 32 memory chips 280 within a row.

The interconnected DO signals from each memory chip 280 in a column of memory chips is connected to the serial input of one of 4-bit shift registers 282. Each 4-bit shift register 282 is located by sequentially enabling the columns of memory chips 280 one row at a time by activiating the corresponding enable row signals. The 4-bit output from 4-bit shift registers 282 is transferred in parallel fashion to one of 8-bit shift registers 285. Each 8bit shift register 285 receives data from two 4-bit shift registers 282. Four such 8-bit shift registers 285 are provided. To produce a 32-bit segment of the scan line the outputs from 8-bit shift registers 285 are shifted out in serial fashion from each 8-bit shift register 285 in sequence. The outputs are combined with OR gate 283 to form the output video signal to video mixer 202.

The commercially available N-channel MOS dynamic RAM chips such as are here preferred require that each address line deactivated within a predetermined time period, typically 2 milliseconds, in order to assure data retention. These chips are organized in a rectangular matrix although only one data input and output line is provided. Activation of each address line therefore assures that each column within the memory chip is activated within the required time. It is a characteristic that with a bit image memory system in accordance with the present invention special chip refresh cycles are not necessary as chip refresh is performed during the normal CRT refresh display operations.

Refresh for memory chips 280 is accomplished by performing one recycle on each of 64 possible memory chip address codes as specified by chip address inputs AO–A5. The memory modules 281 are organized and designated in such a way as to make the total display refresh read accesses from the 64-chip address groups at a sufficiently high rate compatible with the overall display refresh time.

The addressing mode for the rows, columns, and individual memory chips 280 for one of memory modules 281 is shown in Table I. The address of a 32-bit line segment as displayed along a single raster line is specified by an 8-bit address in the X axis (XO–X7) and an 11-bit address in the Y axis (YO–Y10). As individual bits are not addressable within a single 32-bit segment while each raster line is individually addressable, more bits are required for the Y axis address than for the X axis. The most significant bits XO and YO are used as dummy bits. This is useful in addressing the memory for writing in a character which overlaps the boundary of the display area with a portion in the display area and a portion outside which is non-displayable. Thus setting either XO or YO to the logical 1 state will producce no response but will prevent a remaining portion of the character from being wrapped around and written at the beginning of the opposite side of the display screen.

The address inputs AO–ALL to memory chips 280, the signals used for chip refresh, the row select signals, the module select signal, and the column select signals are specified in Table I below with their correspondence with the X and Y input signals. During a display refresh cycle, both memory modules 281 servicing a single CRT display unit 104 are enabled regardless of the state of any X, Y, or work station group select inputs. X4 and X3 form the row select signals for the rows of memory chips 280 within each memory module 281. X1 snf X2 are decoded upon a binary to four-line basis to produce the signals ENABLE ROW 1–ENABLE ROW 2. X2 and X1 combined with Y6 through YO form the 6-bit memory chip address. It is to be noted that XO and YO are in the logical 0 state for all on-screen positions. A logical 1 for either of these signals indicates an off-screen position and prevents any write operation on the selected memory module. X5 is used to select between the two memory modules 281 between 32-bit segment along a raster scan line. X5 operates an AND-/OR gate structure (not shown) for performing this function. X6 and X7 are decoded again in a 2-binary bit 2–4 line fashion to produce the column select signals. During the display refresh cycle, the colunm select signals are activated in four 8-bit groups in sequence.

TABLE I

| XO (MSB) | | | YO (MSB) | | |
|---|---|---|---|---|---|
| X1 — A1 | Used for | | Y1 — A11 | | |
| X2 — A0 | Chip Refresh | | Y2 — A10 | | |
| X3 — | Row Select | | Y3 — A9 | | |
| X4 — | | | Y4 — A8 | | |
| X5 — | Module Select | | Y5 — A7 | | |
| X6 — | Column | | Y6 — A5 | Used | |
| X7 (LSB) — | Select | | Y7 — A4 | for | |
| | | | Y8 — A3 | Chip | |
| | | | Y9 — A2 | Refresh | |
| | | | Y10 (LSB) A6 | | |

For a selected type of memory chip 280, predetermined ones of the address input lines must each be selected during a predetermined minimum time period in order to insure data retention within the memory chip. For example, for an Intel Co. 2107B-4, address inputs A0–A5 must each be activated or selected at least once during a 2 millisecond interval. To insure that this function is accomplished during the display refresh cycle without requiring additional cchip refresh cycles, the chip address lines are connected to the X and Y address inputs as specified. It is to be noted that these signals are not connected in corresponding ascending order but are mixed in such a manner to insure that each line will be activated at least once during each refresh time period. The same address code is presented to all memory chip address inputs for four sequential display refresh cycles for reading 32 bits from a row of memory chips 280 but a different row of chips is activated for each of four cycles. The address code presented to the address inputs of memory chips 280 is incremented after cycling through each of the four rows and the four rows are again each selected one at a time over the next four cycles. This sequence continues such that over the course of a signle scan line time four of the 64 required chip refresh codes will have been used in conjunction with display refresh cycles with every memory chip 280 on every memory module 281 within the system. The Y LSB(Y10 is not used as one of the chip refresh address inputs because the display raster line refresh is preferably upon a 2-to-1 interlaced basis as is done with standard television practice so that address Y10 is unchanged during an entire vertical field time. Y6 through Y9 form the four most significant bits of the chip refresh code inputs. These address signals are cycled through once every 16-scan lines. The total chip refresh cycle time is thus equivalent to the 16-scan line times or, for the preferred embodiment, approximately 480 msec which is well below the maximum allowable chip refresh time period of 2 msec for the preferred chip types. Display refresh and hence chip refresh does not occur during the vertical retrace time which lasts for the preferred components for a period of 0.9 msec. This time period added to the 480 msec results in a worst case chip refresh period of 1.38 msec, still well within the maximum allowable period.

Complete memory erasures are initiated with a bulk erase control signal such as shown in the timing diagram of FIG. 15. In the bulk erase mode, normal display refresh cycles are changed into write cycles and the 32 bits per memory board access during a display refresh cycle are overwritten with zeros. In this manner the contents of the memory formed from two memory modules 281 is cleared within one full display update cycle within two consecutive vertical field times. During the bulk erase time, a busy signal is produced which is relayed back to the CLU I/O logic 177 to prevent attempts to write data into BIM 172.

In order to write data into memory, both the proper ENABLE ROW COLUMN SELECT signals must be activated along with the proper memory address. Data is read into one ofl memory modules 281 preferably 8 bits at a time. During a memory data read cycle, memory data from the selected address is loaded into an 8-bit bit output buffer register (not shown). The contents of the output buffer register is coupled onto a memory output data bus or may be used elsewhere in the system.

Again as shown in the timing daigram of FIG. 15, a display refresh cycle is initiated with DRF and CE control signals. 32 bits of data are read out simultaneously from each memory module through 4-bit shift registers 282 and into 8-bit shift registers 285. Every load pulse for 8-bit shift registers 285 is followed by seven shift clocks which extract the data in serial form. The output data streams from all of the bit shift registers 285 on each of two memory modules 281 are combined to form the one single bit video stream to one of CRT display units 104.

Referring next to FIG. 16 there is shown a logic diagram of BIM access control 195. Included therein are chip select driver circuits 290 for providing buffer amplification for all display refresh data and control signals including X and Y addresses and the DRF (Display Refresh) control signal. The outputs from the chip select driver circuit are used to select data from one of the two memory modules 281 for each CRT display unit 104. Outputs from data driver 290 form the data inputs to each memory module 281.

BIM access control 195 performs the function of allocating all DRF memory access cycles upon a priority basis. The various access request signals from video formatter 194 are all coupled to input priority encoder 291 which may be a read-only memory with appropriate coding. Input priority encoder 291 produces a 3-bit output signal in the form of a code representing the active one of the access request having the highest priority as determined by the pre-programmed bits within the read-only memory. This 3-bit code is transferred to and held within current address holding register 292 upon each succeeding BIM clock pulse. When BIM 172 is able to accept a new data input, the BIM acknowledge enable signal is activated causing acknowledge demultiplexer 293 to produce upon a single one of its multiple outputs a signal indicating to video formatter 194 which access request is to be satisfied and accordingly what data should then be sent back to BIM access control 195.

BIM access control 195 also includes multiplexer 295 in the direct data input path. One set of inputs to demultiplexer 293 is the data from video formatter buffer registers while the other set of inputs are all logical 0's. During bulk memory erase cycles the logical 0 inputs are selected and written into all memory locations. At all other times multiplexer 295 is set to accept data inputs from video formatter buffer registers.

Figure 17:
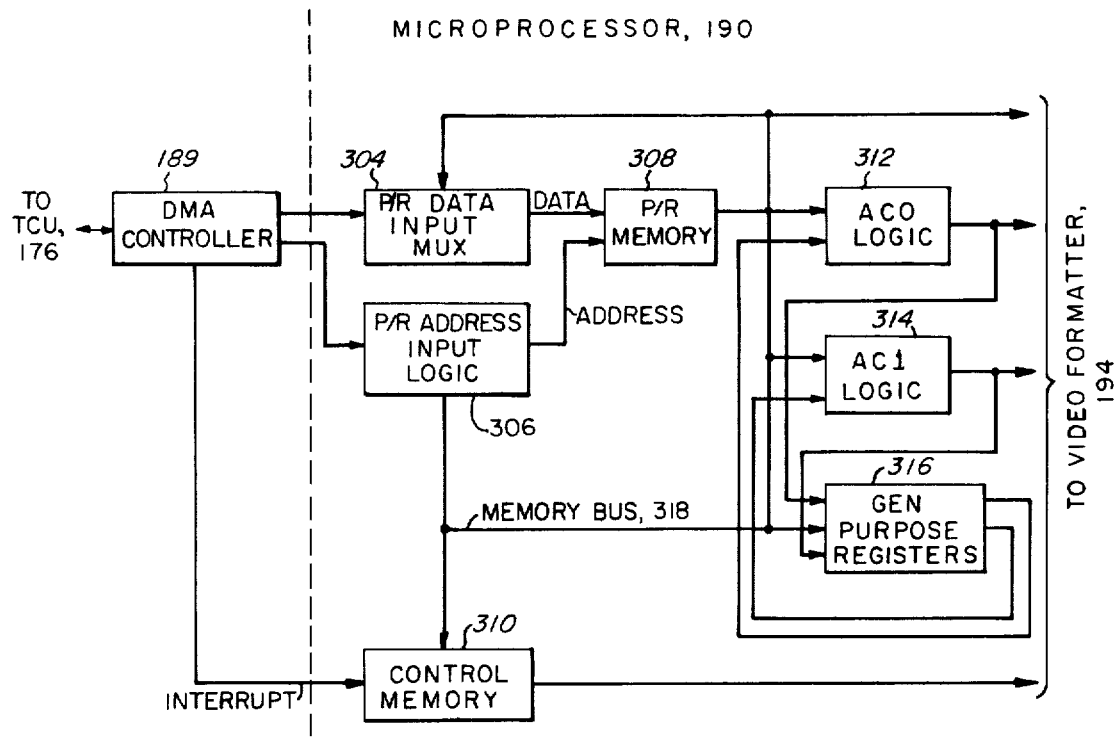
FIG. 17 is a diagram of the direct memory access controller and microprocessor of the system shown in FIG. 6.

Referring next to FIG. 17 there is shown a block diagram of microprocessor 190 within arithmetic unit 188. All input data, control signals, and timing or clock signals from TCU 176 are coupled into microprocessor 190 from DMA controller 189. DMA controller 189 temporarily stores the address, data, and control information received from TCU 176 then transfers address information to P/R input logic 306 and data and control information to P/R data input multiplexer 304 and control memory 310. As soon as data, control information, or address information is transferred out of DMA controller 189, a "BUSY" flag or signal is sent to TCU 176 and an appropriate interrupt signal is also coupled to control memory 310. The "BUSY" flag is reset by the program control function of microprocessor 190 when microprocessor 190 is again able to accept new data or address information.

The basic computing elements of microprocessor 190 include P/R memory 308, control memory 310, two accumulators (AC0 312 and AC1 314), and general purpose registers 316. The function of P/R memory 308 is generally to provide instructions for performing requisite arithmetic computations. P/R memory 308 includes both random access and permanently programmed portions. Both portions are addressable with the same address lines from P/R address input logic 306. In a preferred embodiment, the first 64 addresses (0-63) are random address locations in which data may be read in from P/R data input multiplexer 304 and stored. Addresses from 64 to 255 are unused to permit expansion of the random access protion of P/R memory 308. Addresses from 256 onward correspond to the read-only portion of the memory,. Of course, no data may be read into this portion.

P/R memory 308 stores the basic data inputs from TCU 176 such as line end points, character spacing, character width and height, and italic slant. In the permanently programmed portion of the P/R memory 308 are stored instructions in the form of addresses for permanently programmed control memory 310 for controlling accumulators 312 and 314 and general purpose registers 316 for performing the requisite arithmetic functions. For example, when a set character width instruction is received from TCU 176, the character width W is stored within the random access portion of P/R memory 308 within the random access portion at an address location reserved only for this number. Each time a data word is received a DMA controller 189 for setting the character width, P/R address input logic 306 produces an output address corresponding to this location within P/R memory 308.

Also, each time this tupe of word is received, after W is loaded into the random access portion of P/R memory 308, P/R memory 308 is addressed by a second address from P/R address input logic 306 corresponding to the address within the permanently programmed portion of P/R memory 308 at which is stored the start address in control memory 310 for the instruction sequence which calculates ΔW. This address is coupled from P/R memory 308 on memory bus 318 to the address inputs of control memory 310. Control memory 310 then produces at its outputs a sequence of digital instructions for causing accumulators 312 and 314 and general purpose registers 316 to calculate the function ΔW = 20/W. These instructions are coupled to accumulators 312 and 314 and general purpose registers 316 upon memory bus 318.

Two types of control sequences are provided by control memory 310: the first involves only internal computation requiring no transfer of data to video formatter 194 while the second requires such a transfer of data. With the first type, control memory 310 permits a continuous sequence of arithmetic operations by producing on its outputs a continuous sequence of control signals until the operation specified has been completed. For the second type of computation involving transfer of data to video formatter 194 an enable signal is required from video formatter 194 for each transfer of data thereto. Thus, as each data computation is completed by control memory 310, a separate enable pulse is required from video formatter 194 before proceeding with the next operation..

Normal data computation sequences are interrupted upon receipt at control memory 310 of an interrupt signal from DMA controller 189. When normal data computation operations are thus interrupted, data and control signals may be transferred from TCU 176 through DMA controller 189 to microprocessor 190 without TCU 176 having to wait and not be able to perform other needed operations until microporcessor 190 was finished with its immediate operations. In this manner a much faster overall system operation is obtained whereby an operator's inputs produce a faster response and display of data upon one of CRT display units 104 than could be done with previously known systems.

Accumulators 312 and 314 are preferably 16-bit high speed multiple purpose arithmetic units such as, for example, Texas Instruments Company integrated circuit type SN74181. General purpose registers 316 are preferably 16-bit parallel entry data registers but may alternatively be a 16-bit parallel input random access memory. Control memory 310 provides all of the control inputs to the arithmetic units of accumulators 312 and 314 and controls the interconnection configuration between accumulators 312 abd 314 and general purpose registers 316. Control memory 310 can configure accumulator 312 and 314 either as two separate 16-bit accumulators or as a single 32-bit accumulator with appropriate interconnection.

Flow diagrams for all the various character generation formats, line generation procedures and raster operations are shown in FIGs. 18–29. The system rests at the start location specified at the top of FIG. 9 while no data is being processed and a data or control message is being awaited from TCU 176. At this time all the various flags such as the interrupt flags are reset. Once a message from TCU 176 is received, the message type is examined at DMA controller 189 to determine whether or not a change in data processing priority is required. Should the data message rceived require higher priority than the data then being processed, the locations with the random access portions of P/R memory 308 being used for the previous data processing operation are moved to another location having a lower priority and the new data read into the previously occupied locations.

A determination is then made of whether an LDF message type was received. If the message was other than an LDF message for character generation, the data within the message is transferred directly to the character generator memory. If no further data is then available from TCU 176 which is to be transferred to the character generator memory, the system is reset to the START position. If an LDF message type was received, the particular type of LDF message is decoded as either an EXF message requiring generation of a line or as an FF message requiring generation of one or more characters. The EXF and FF message types are further decoded as specified in the diagrams of FIGs. 19 and 20. If the message type is EXF the possible operations are: write line, erase line, write raster, erase raster, set italics, and bulk erase. If the message type is FF, the required operations are one of: write fixed format character, set character width, set point size, load $X_0$ or $Y_0$ positions, or write characters in the tabular format.

Figure 21:
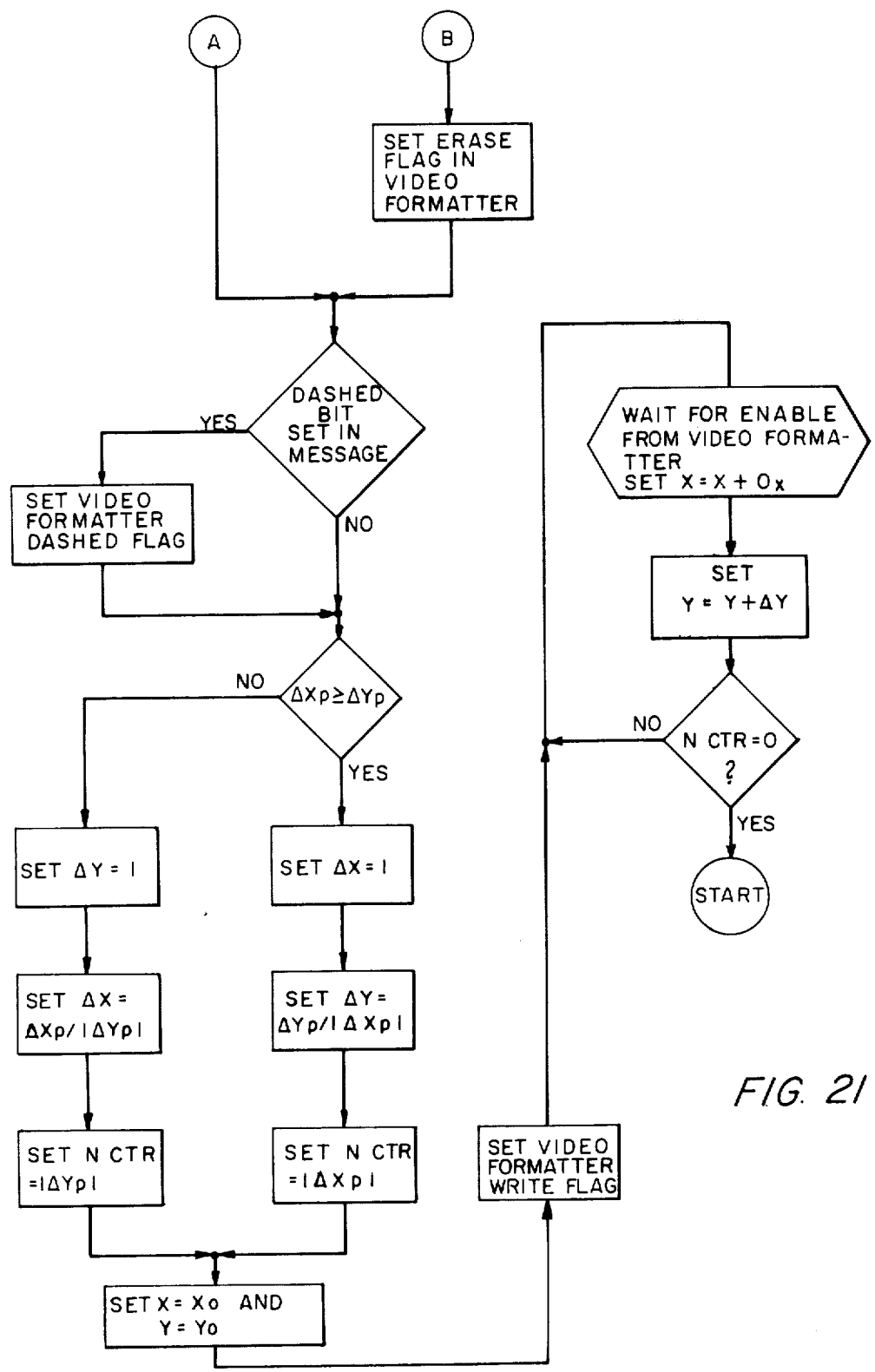

The data processing sequence for writing and erasing lines is specified in FIG. 21. The procedure is the same for both writing and erasing lines with the exception that in the erase mode an erase flag is set within video formatter 194 which causes the video signal produced to erase rather than write in new data. The message word is examined to see whether or not a bit is set within the data field of the message calling for the line to be dashed. If the line is to be dashed, a flag is set within video formatter 194, causing the output data stream to be turned off and on at a predetermined rate thereby making the line to be displayed as dashed.

A computation is then made of the quantities $\Delta X_p$ and $\Delta Y_p$ equal respectively to the length of the line in the X and Y axes. These are computed as the difference between the end points of the line. A comparison is then made between $\Delta X_p$ and $\Delta Y_p$ to determine which is the greater. If $\Delta X_p$ is greater than or equal to $\Delta Y_p$, the quantity $\Delta X$, the distance between adjacent dots in the line along the X axis, is set equal to 1. $\Delta Y$, the distance between adjacent dots along the Y axis, is set equal to $\Delta Y_p / |\Delta X_p|$. The N-counter within video formatter 194 is initialized to the numeric value of $|\Delta X_p|$. The same procedure is followed should $\Delta Y_p$ be greater than $\Delta X_p$ with X and Y interchanged from the previous case. Accumulators 312 and 314 are next initialized with X and Y start position values $X_0$ and $Y_0$. Actual computation of line dot position is then ready to begin.

A flag is set within video formatter 194 indicating that a write operation is ready to commence as soon as video formatter 194 is able to accept new data. When an enable signal is received back from video formatter 194, new X and Y positions are computed as the present position plus the respective $\Delta X$ and $\Delta Y$ quantities. This computation continues iteratively with the N-counter within video formatter 194 decremented by one count for each iteration. When the output of the N-counter has reached 0, the line is finished and the system is reset to the start position.

Figure 22:
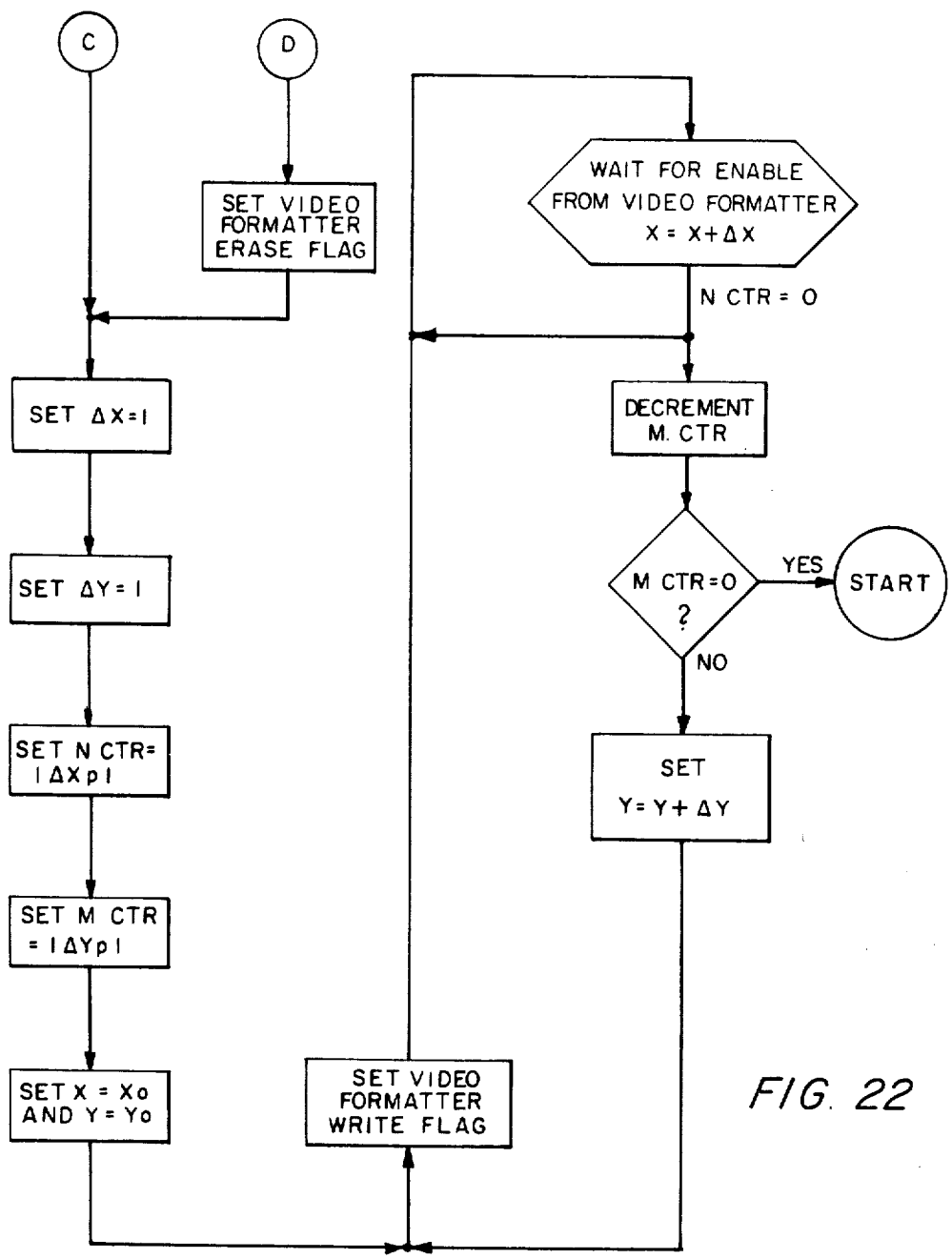
Figure 23:
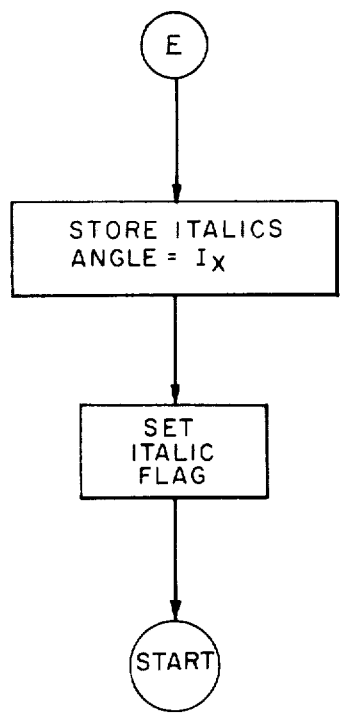

The procedure for writing and erasing rasters is shown in FIG. 22. Again, the procedure is the same for writing and erasing except that an erase flag is set within video formatter 194 in case of an erasing operation. The quantities $\Delta X$ and $\Delta Y$ are set to the minimum interdot spacing of 1. The N-counter within video formatter 194 is initialized to the value of $\Delta Y_p$. The M-counter is formed by one of accumulators 312 or 314 in a loop with one of general purpose registers 316. The X and Y values are initialized to the start position of $X_0$ and $Y_0$ indicative of the upper left hand corner of the raster to be written or erased. $\Delta X_p$ and $\Delta Y_p$ represent the distance from $X_0$ and $Y_0$ to the opposite corner of the raster.

Video formatter 194 is then signalled with the write flag to indicate that new data points are then available. As soon as video formatter 194 produces an enable signal indicating that it is then able to accept new data. At this time, a new X position is computed as the present X position plus $\Delta X$. New X positions are then continually computed while the value in the N-counter is decremented once for each new X position. When the count within the N-counter reaches 0, the M-counter is decremented by one count. If the value in the M-counter has not reached 0, the Y value is recomputed as the present Y position plus $\Delta Y$. The write flag to video formatter 194 is again reset and the N-counter reinitialized. New X positions are then computed for each line in Y. The process continues until the value computed by the M-counter reaches 0 at which time the system is reset to START.

For an EXF word indicating setting of italics tilt, the italics tilt is specified as a binary number indicative of the distance to the right or left from the start position of the previous line of a character each succeeding line of data within the character is to be begun. This value is stored in one of general purpose registers 316 and a flag is sent to video formatter 194 indicating that the next sequence of characters is to be written in italics with the specified slant.

Figure 24:
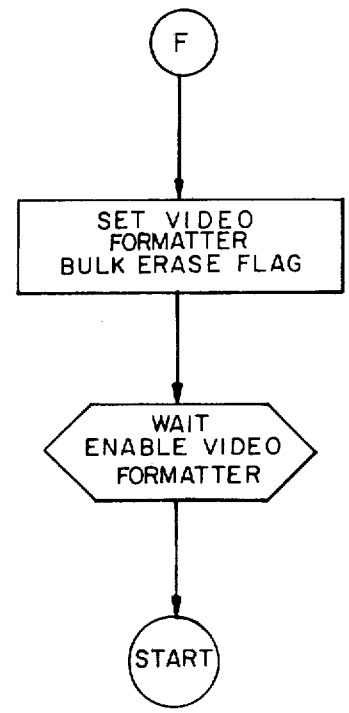
Figure 28:
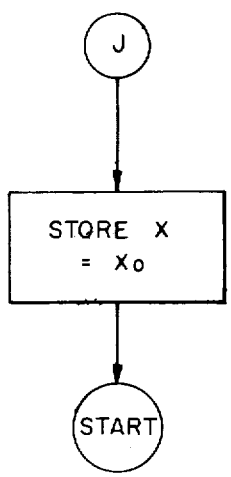
Figure 29:
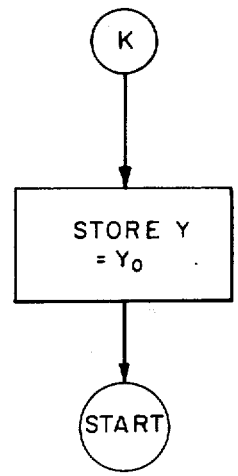

For the bulk erase mode as shown in FIG. 24, the video formatter bulk erase flag is set. As soon as an enable command is received for video formatter 194, control is returned to the start position.

Figure 25:
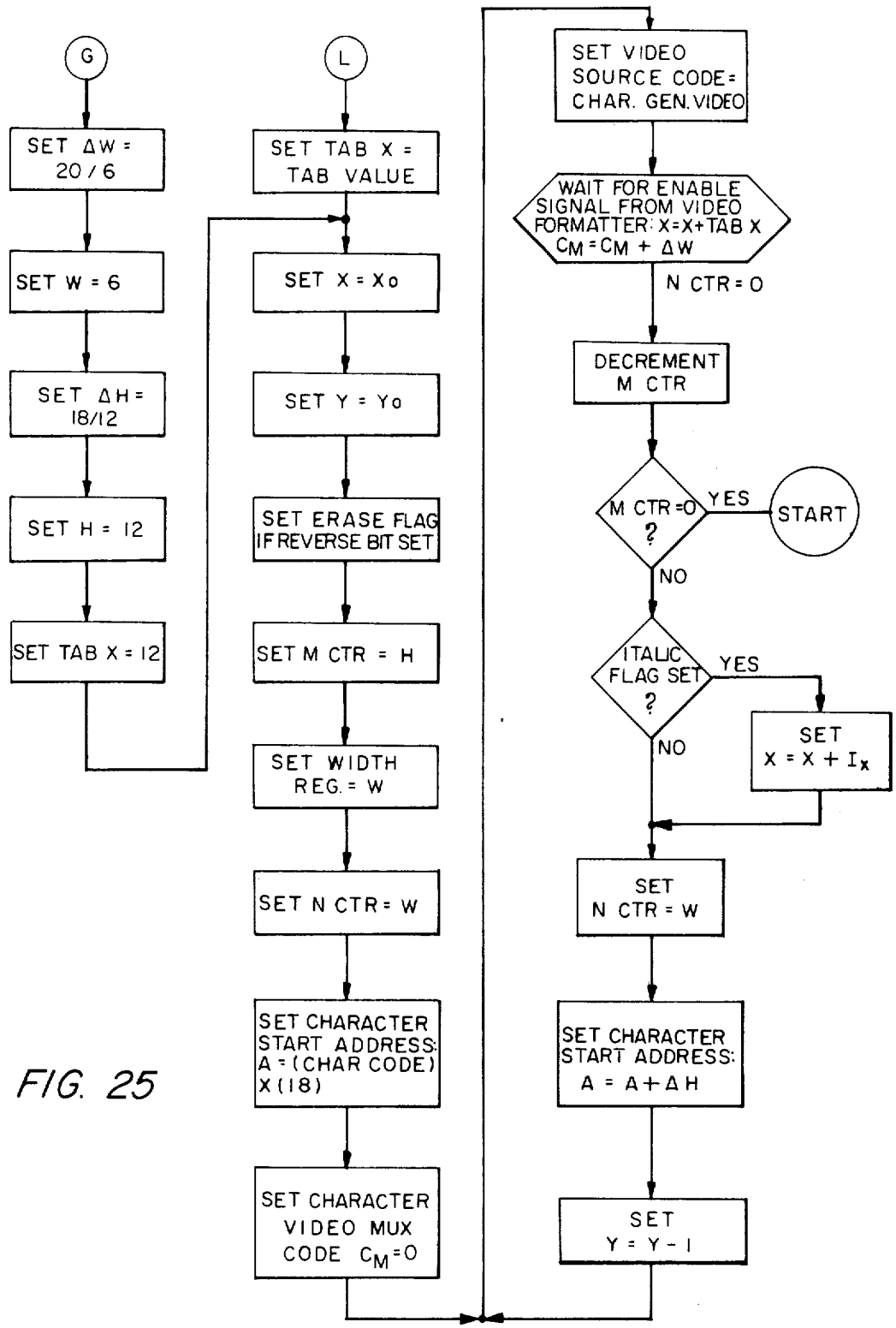
Figure 26:
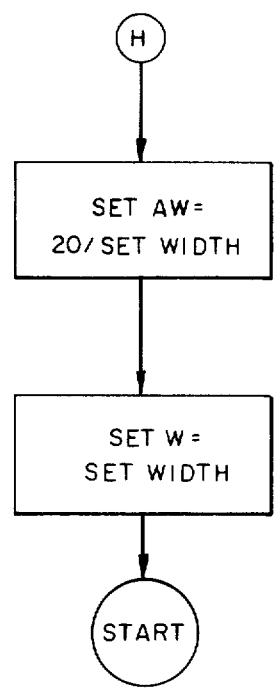
Figure 27:
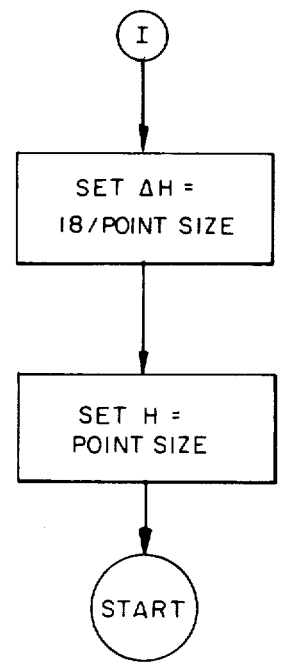

The procedure for writing characters into BIM 172 is specified in FIG. 25. For fixed format characters the procedure starts at reference G while for tab characters the procedure starts at reference L. For fixed format (i.e., fixed size of 6 point width and 12 point height) characters, the character $\Delta$ width is first set to a fixed format value of 20/6. W is set equal to 6 and the height H is set equal to 18/12 while H is set equal to 12. The tab value TAB $\Delta X$, the spacing between adjacent characters, is set equal to 12 also. For tabular characters the TAB $\Delta X$ value is set to the tab value specified in the character word from TCU 176. The X and Y values are initialized to the start positions $X_0$ and $Y_0$. The erase flag is sent to video formatter 194 if the reverse bit within the character word is set. The M-counter formed by one of accumulators 312 or 314 and one of general purpose registers 316 is initialized to the value of H. The width register withing the character generator is initialized to W as is the N-counter within video formatter 194. The character start address code for addressing the character generator RAM is set to the value of the character code multiplied by 18. The character video multiplexer code is initialized to a value of 0. The video source code to video formatter 194 is set for video formatter 194 to receive data from the character generator.

As soon as an enable signal is received from video formatter 194, the first line of dots along the X axis for the first character is read out of the character generator and coupled to video formatter 194. The X value is then incremented to the present position plus the value TAB $\Delta X$. The character video multiplexer code is then incremented by a value of W. The N-counter is decremented by one count for each dot in the X axis for each character. Once the count output of N-counter has reached 0 the M-counter is decremented by one count. If the count within the M-counter has not reached 0, a determination is made whether or not the italic flag is set. If it is set, the value of the X position is incremented by the value of the italics slant $I_x$. The N-counter is then reinitialized to W and the character start address is incremented by a value of $\Delta H$. The Y value is decremented by one scan line. The video source code is again set and the procedure continued until the value within the M-counter has reached 0 at which time control is returned to the start position.

The operations for setting width, point size, and loading X and Y positions are simply register loading operations as specified in the diagrams of FIGS. 26–29. For the set width operation, $\Delta W$ is computed as 20/set width (the width specified in the correspnding character word with W set directly equal to the set width). Similarly, for setting the point size, $\Delta H$ is computed as 18/point size as specified in the appropriate character word. H is set equal directly to the value of the point size.

Although the above specified operations may be performed with a number of commercially available microprocessors or minicomputers, the structure shown in FIG. 17 is preferred for its speed of operation as used with the present invention.

Figure 30:
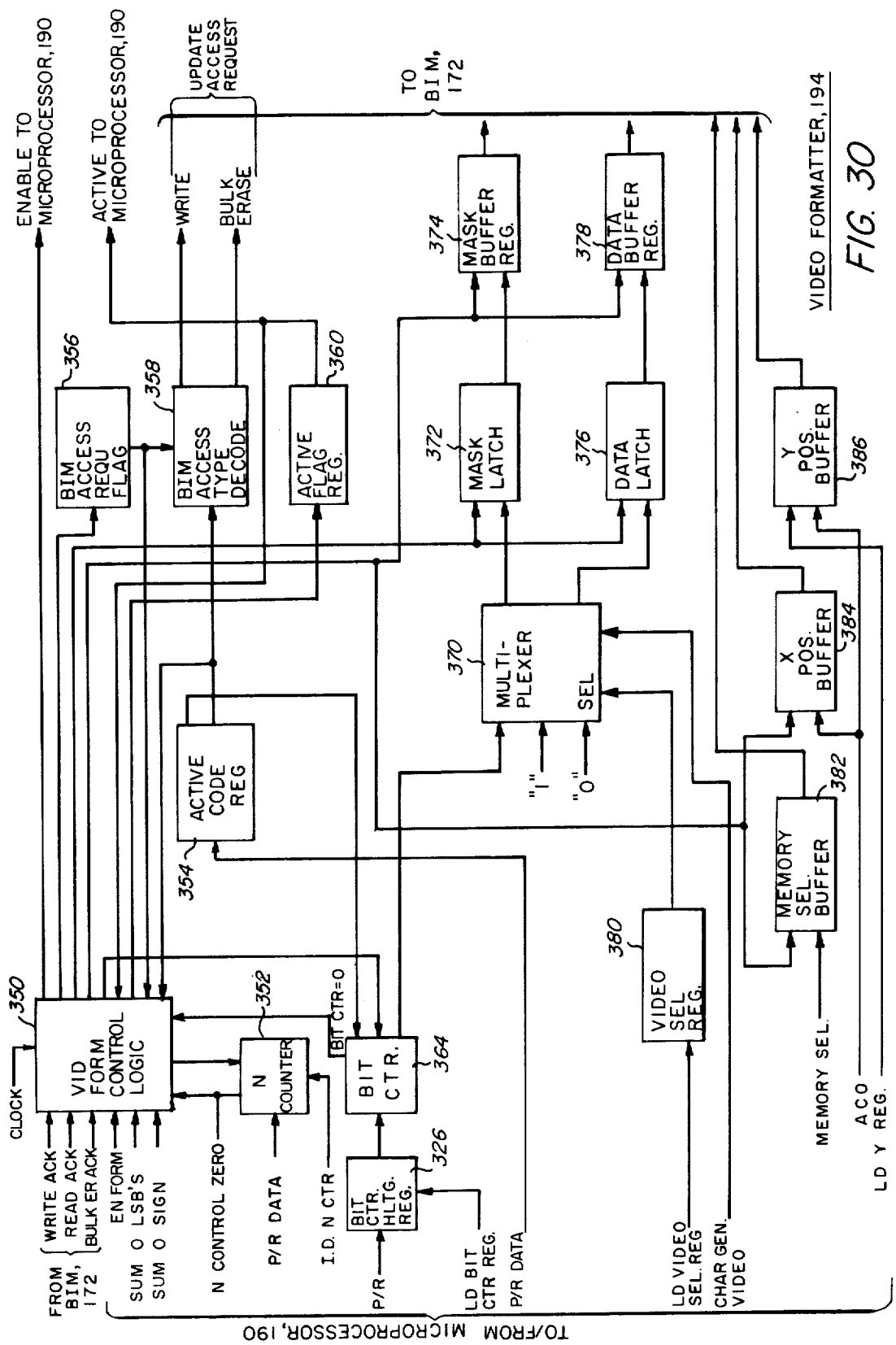
FIG. 30 is a diagram of the video formatter of the system shown in FIGS. 6.

Referring next to FIG. 30 there is shown therein a block diagram of video formatter 194. The clock signal, acknowledge inputs from BIM 172 and control and dat inputs from microprocessor 190 are coupled into video formatter control logic 350 where the signals are used and distributed as required. Also produced therein is the enable signal to microprocessor 190 when video formatter control logic 350 detects that no further data transfer operations are then taking place within video formatter 194 so that new data inputs may be accepted.

N-counter 352 is also provided within video formatter 194. N-counter 352 is preset by data from P/R memory 308 within microprocessor 190 upon application of a load pulse. As explained earlier, N-counter 352 is loaded with a preset value then decremented once for each bit or byte transferred from microprocessor 190 to video formatter 194. N-counter 352 is generally decremented by one count for each data transfer between microprocessor 190 and video formatter 194.

Also provided is bit counter 364 which receives data inputs from microprocessor 190 through bit counter holding register 326. Bit counter holding register 326 is loaded upon application of a load pulse from microprocessor 190. Bit counter 364 is generally used to produce dashed lines with the length of the dashes determined by the cycling rate of bit counter 364 which in turn is determined by the value of the incoming presetting code. The output data for both line and character data passes through data latch 376 and data buffer register 378 before being coupled to BIM 172. The output of bit counter 364, in the case of dashed lines, is passed through multiplexer 370 to enable inputs of mask latch 372 and data latch 376 to alternately enable and disable the line video data so as to produce a dashed line effect.

Data is transferred from video formatter 194 to BIM 172 in 8-bit bytes. In some cases it is desirable to transfer fewer than 8 bits at one time. Mask bits are thus provided for each data bit through mask latch 372 and mask buffer 374. Activation of one of the mask bit output signals from mask buffer 374 instructs BIM 172 to ignore the corresponding data bit from data buffer register 378. The signals from mask buffer register 374 and data buffer register 378 are transferred to BIM 172 simultaneously.

Also provided is an active code register 354 which stores the opcode of the particular data type then being acted upon. Among its functions, active code register 354 produces an enable signal to bit counter 364 in the case of dasehd lines. Active code register 354 also sends a signal to BIM access type decoder 358 which in turn produces a signal relayed to BIM 172 indicative of whether data is to be read in or erased from the memory. Active flag register 360 is set in the active state when video formatter 194 is actively processing and transferring data to BIM 172. Its output is fed back to microprocessor 190.

Video select register 380 stores a code determinative of the type of data to be loaded into BIM 172. This code is coupled to the select inputs of multiplexer 370 causing it to select for the data coupled to BIM 172 one of character, vector (line), or erase data sources. In the case of vectors, multiplexer 370 selects all logical ones as inputs. However, for dashed vectors or lines, the output of bit counter 364 is selected. For erasing data previously stored in BIM 172, the all logical 0's input is selected.

The X and Y position inputs used for addressing locations within BIM 172 are coupled from the first accumulator of microprocessor 190 through X and Y position buffers 384 and 386. X position buffer 384 is loaded with the same load pulse that loads mask buffer 374 and data buffer register 378. The Y position is loaded into Y position buffer 386 through an externally supplied LOAD Y REGISTER pulse. Memory select buffer 382 is loaded with a code from microprocessor 190 that is indicative of the work station upon which the data then being generated is to be displayed. This code thus selects the memory modules within BIM 172 into which the data is to be written or erased for display upon the proper work station 104.

Figure 31:
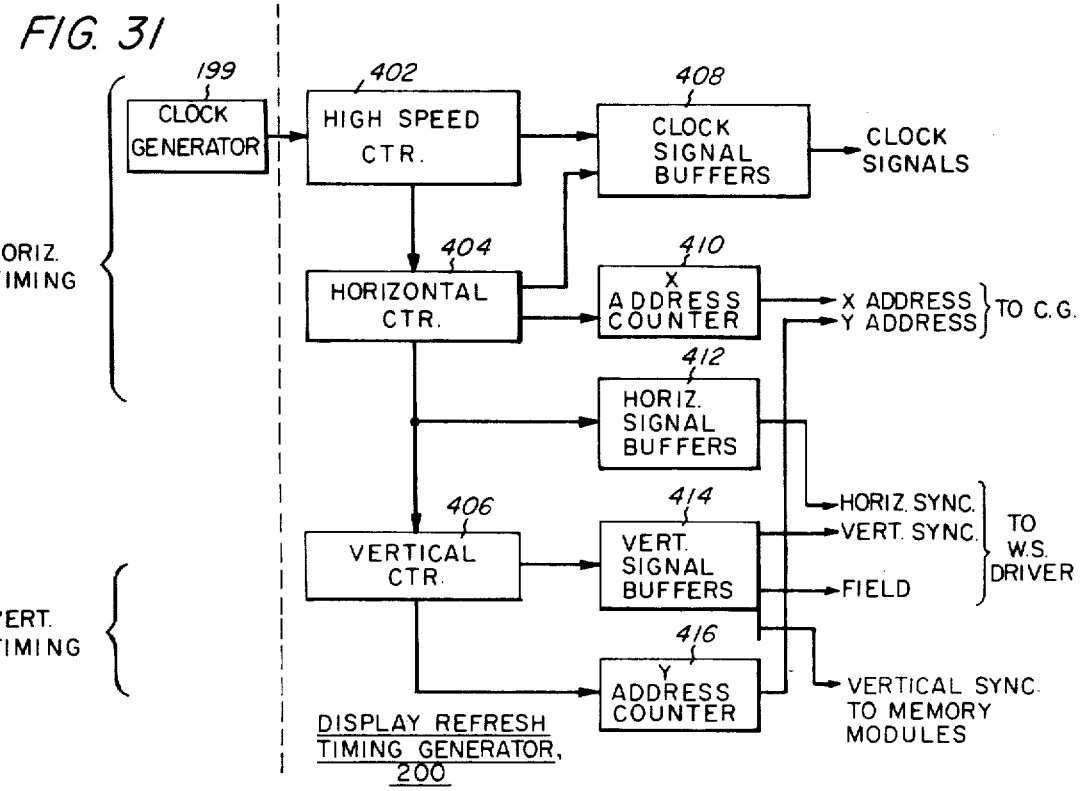
FIG. 31 is a diagram of the display refresh timing generator of the system shown in FIG. 6.
Figure 10:
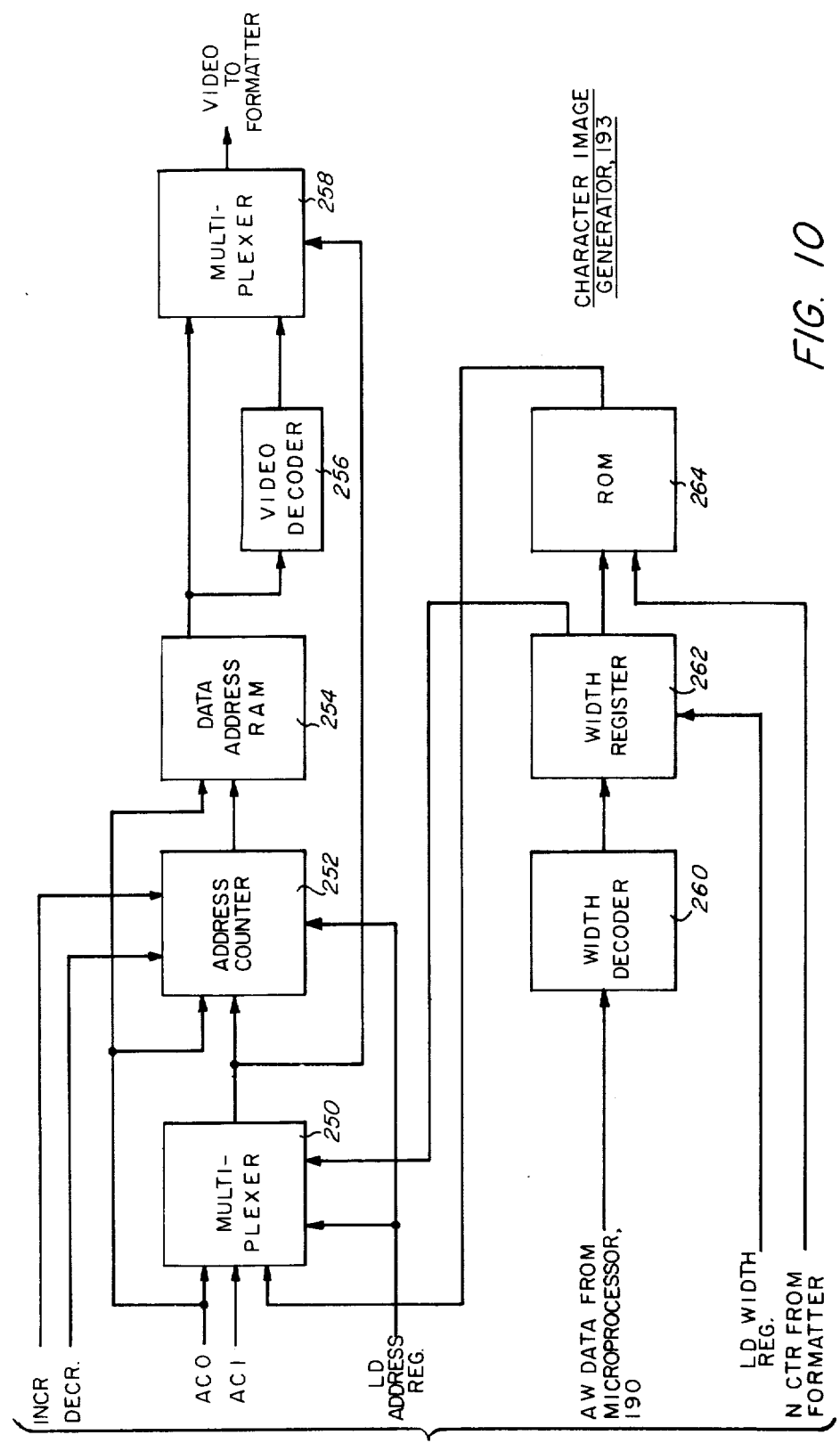
FIG. 10 is a diagram of the character image generator of the system shown in FIG. 6.

Referring next to FIG. 31 there is shown a diagram of clock generator 199 and display refresh timing generator 200. Clock generator 199 is a square wave or rectangular pulse oscillator of well-known design. Its frequency is preferably crystal controlled. The output pulse stream from clock generator 199 is coupled to high speed counter 402. High speed counter 402 divides the higher frequency output from clock generator 199 to the various clock frequencies required within the various components within the system. Signal buffers 408 amplify the generated clock pulse streams for use throughout the system.

Horizontal counter 404 further counts down the output of high speed counter 402 producing an output pulse corresponding to the start time of each horizontal scan line. Vertical counter 406 further divides the output of horizontal counter 404 producing an output pulse corresponding to the start time of each vertical retrace. For a system having 1,024 interlaced scan lines, vertical counter 406 produces one pulse for each 512 pulses from horizontal counter 404. Horizontal signal buffers 412 and vertical signal buffers 414 amplify and distribute the respective horizontal and vertical sync pulses produced at the outputs of horizontal counter 404 and vertical counter 406 for distribution within the system. X address counter 410 operates upon the output of horizontal counter 404 to produce a digital output number indicative of the 32-bit segment of each horizontal scan line being acted upon at any given instant. X address counter 410 is reset by horizontal counter 404 at the beginning of each scan line. In a similar fashion, Y address counter 416 produces an output number indicative of the Y position or equivalently the number of the scan line or data within BIM 172 then being acted upon.

This completes the description of the preferred embodiments of the invention. Althugh preferred embodiments of the invention have been described, it is believed that numerous modifications and alterations would be apparent to one having ordinary skill in the art without departing from the spirit and scope of the invention.

What is claimed is:

1. A bit image memory for use with a visual display comprising in combination:
    a semiconductor memory, said memory having at least one digital storage location for each elemental display position upon said visual display; and
    means for reading out data from said memory to produce an image upon said visual display, said reading-out means being coupled to address inputs and data outputs of said memory, said memory being refreshed within the refresh time period of said visual display means.

2. The combination of claim 1 wherein:
    said semiconductor memory comprises a plurality of semiconductor random access memories.

3. The combination of claim 2 wherein:
    each of said random access memories has a plurality of address input lines, predetermined ones of said address input lines being activated within a predetermined maximum refresh time determined to insure data retention with each of said random access memories.

4. The combination of claim 3 further comprising:
    means for reading out data from said semiconductor memory to produce a video signal for operating said visual display means.

5. The combination of claim 4 wherein said reading out means comprises:
    a plurality of shift registers.

6. The combination of claim 5 wherein:
    outputs for each of said shift registers are combined to form said video signal.

7. A bit image memory system for refreshng one or more raster scanned visual display devices comprising in combination:
    a plurality of random access memory devices, said devices being arranged in a plurality of rows and columns;
    a first plurality of shift registers, one or more inputs of each shift register of said first plurality of shift registers being coupled to data outputs of said random access memory devices for receiving data read out from one of said columns of memory devices;
    a second plurality of shift registers, one or more inputs of each shift register of said second plurality of shift registers being coupled to outputs of at least two of said first plurality of shift registers for receiving data from said first plurality of shift registers;

means for shifting data out of said shift registers of said second plurality of shift registers one of said shift registers of said second plurality of shift registers at a time; and means for summing the outputs of said shift registers of said second plurality of shift registers.

8. The combination of claim 7 wherein said random access memory devices each comprise:

an MOS random access memory chip.

9. The combination of claim 7 wherein:

each of said random access memory devices has a plurality of address input lines, predetermined ones of said address input lines requiring activation within a predetermined maximum time period to retain data stored in said memory devices.

10. The combination of claim 9 further comprising:

means for producing digital signals for addressing said random access memory devices, said digital signals being coupled to address inputs of said random access memory devices.

11. The combination of claim 10 wherein: said digital signals for addressing said random access memory represents positions upon the display surface of one of said visual display devices.

12. The combination of claim 11 wherein:

said digital signals representing said positions are ordered in a binary sequence;

said address input lines are ordered in a binary sequence; and at least some of said digital signals representing said positions are coupled to said address input lines in other than corresponding order.

13. A digital data display system comprising in combination:

means for producing digital signals representing character patterns;

means for producing digital signals representing line patterns;

a plurality of display means;

a plurality of memory modules for storing data in response to said digital signals representing said character and line patterns, two of said memory modules being provided for storing said character and line patterns for each of said display means;

means for reading data out of said memory modules, said reading-out means being coupled to data outputs of said memory modules; and means for converting the read-out data from said memory modules to a video signal for operating said display means.

14. The combination of claim 13 wherein said display means each comprises:

raster scanned cathode-ray tube display means.

15. The combination of claim 14 wherein:

each raster scan line upon each of said display means is divided into a plurality of segments, data for producing said video signal for adjacent ones of said line segments being coupled from alternate ones of said memory modules; and said reading-out means comprises means for alternately reading data out of two of said memory modules.

16. The combination of claim 15 wherein each of said memory modules comprises:

a plurality of rows and columns of random access memory devices, each of said memory devices having a plurality of address input lines, at least one data input line, and at least one data output line, corresponding ones of said address input lines from each of said memory devices being coupled together and said data output lines from said memory devices within each column being coupled to one of a plurality of shift registers, one of said columns of memory devices being provided for each elemetal display area within each of said segments.

17. The combination of claim 16 further comprising:

means for addressing said memory devices, said addressing means producing addressing signals coupled to address inputs of said memory devices.

18. The combination of claim 17 wherein said memory devices each comprise:

a 1 × N-bit MOS random access memory.

19. The combination of claim 18 wherein:

said addressing means activates predetermined ones of said address input lines within a predetermined maximum time period during normal refresh of said display means to maintain said data stored in said memory devices.

* * * * *

UNITED STATES PATENT OFFICE
CERTIFICATE OF CORRECTION

Patent No. 4,069,511      Dated January 17, 1978

Inventor(s) Helmut Lelke

It is certified that error appears in the above-identified patent and that said Letters Patent are hereby corrected as shown below:

In the Specifications

Column 1,    line 21: delete "computer" insert - customer - ;
               line 44: change "tub" to - tube - ;
               line 59: change " character" to - characters - ;

Column 2,    lines 2 & 3 underline - inter alia - ;

Column 10,   line 41: underline - Load Device Address - ;
               line 49: underline - Write Fixed Format Character - ;
               line 55: underline - Load Character Point Size Register - ;
               line 63: underline - Load $X_0$ Register - ;
               line 67: underline - Load $Y_0$ Register - ;

Column 11,   line 1: underline - Load Character Set Width Register - ;
               line 5: underline - Write DVA - ;
               line 9: underline - Jump and Store Return - ;
               line 14: underline - Jump To Graphic and Return - ;
               line 23: underline - Execute Transfer Function - ;
               line 26: underline - Write Line - ;
               line 28: underline - Erase Line - ;

UNITED STATES PATENT OFFICE
CERTIFICATE OF CORRECTION

Patent No. 4,069,511                    Dated January 17, 1978

Inventor(s) Helmut Lelke

It is certified that error appears in the above-identified patent and that said Letters Patent are hereby corrected as shown below:

Column 11, line 31: underline - <u>Write Raster</u> - ;
           line 34: underline - <u>Erase Raster</u> - ;
           line 36: underline - <u>Italic Select</u> - ;
Column 18, line 4: change "ALL" to - All - ;
           line 23: change "segment" to - segments - ;
           line 52: change "cchip" to - chip - ;
Column 19, line 3: change "(Y10" to - (Y10) - ;
           line 12: change "msec" to - μsec - ;
           line 18: change "msec" to - μsec - ;
           line 36: change "ofl" to - of - ;
           line 63: after "195" add - also - ;
Column 20, line 52: change "protion" to - portion - ;
           line 54: delete the comma after memory ;
Column 21, line 5: change "tupe" to - type - ;
           line 43: change "microporcessor" to - microprocessor - ;
           line 59: change "abd" to - and - ;
Column 22, line 6: change "rceived" to - received - ;
column 24, line 40: change "dat" to - data - ;

Signed and Sealed this

Sixteenth Day of May 1978

[SEAL]

Attest:

RUTH C. MASON
Attesting Officer

LUTRELLE F. PARKER
Acting Commissioner of Patents and Trademarks